US012689510B2

(12) United States Patent
Riepel et al.

(10) Patent No.: US 12,689,510 B2
(45) Date of Patent: Jul. 21, 2026

(54) FAST ATTRIBUTE-BASED ENCRYPTION WITH IMPROVED SECURITY

(71) Applicant: NTT Research, Inc., Sunnyvale, CA (US)

(72) Inventors: Doreen Riepel, San Diego, CA (US); Hoeteck Wee, Sunnyvale, CA (US)

(73) Assignee: NTT Research, Inc., Sunnyvale, CA (US)

( * ) Notice: Subject to any disclaimer, the term of this patent is extended or adjusted under 35 U.S.C. 154(b) by 58 days.

(21) Appl. No.: 18/908,648

(22) Filed: Oct. 7, 2024

(65) Prior Publication Data

US 2025/0119287 A1     Apr. 10, 2025

Related U.S. Application Data

(60) Provisional application No. 63/588,287, filed on Oct. 5, 2023.

(51) Int. Cl.
*H04L 29/06* (2006.01)
*H04L 9/30* (2006.01)

(52) U.S. Cl.
CPC ..................................... *H04L 9/30* (2013.01)

(58) Field of Classification Search
None
See application file for complete search history.

(56) References Cited

U.S. PATENT DOCUMENTS

| | | | | |
|---|---|---|---|---|
| 8,559,631 B1 * | 10/2013 | Waters | .................... | H04L 9/085 |
| | | | | 726/30 |
| 8,634,563 B2 * | 1/2014 | Vaikuntanathan | .... | H04L 9/0861 |
| | | | | 380/278 |
| 8,862,879 B2 * | 10/2014 | Lerner | ................. | H04L 67/131 |
| | | | | 713/153 |
| 11,509,489 B1 * | 11/2022 | Chen | .................... | H04L 63/126 |

(Continued)

OTHER PUBLICATIONS

Sethi, Anita et al. Analytical Model for Secure Pairing in ad hoc Network. 2018 IEEE 3rd International Conference on Computing, Communication and Security (ICCCS). https://ieeexplore.ieee.org/stamp/stamp.jsp?tp=&arnumber=8586830 (Year: 2018).*

(Continued)

*Primary Examiner* — Jeremiah L Avery
(74) *Attorney, Agent, or Firm* — CipherLaw

(57)     ABSTRACT
The present disclosure provides a method for key-policy attribute-based encryption. The method includes receiving a message to be encrypted, a master public key, and a set of attributes. A random integer s is sampled between 1 and a prime integer p, where p is established by a pairing-friendly curve comprising three groups of two source groups and one target group. Every attribute in the set is hashed to a first source group of the pairing-friendly curve and multiplied by s to generate a set of attribute encodings. A target group element in the master public key is multiplied by s to generate a blinding factor. The message is masked with the blinding factor. A ciphertext is computed comprising the masked message, the set of attributes, the set of attribute encodings, and an encoding of s in a second source group of the pairing-friendly curve. The ciphertext is then outputted.

20 Claims, 3 Drawing Sheets

Cryptographic Tools          NTT Math Library

(56) References Cited

U.S. PATENT DOCUMENTS

| | | | | |
|---|---|---|---|---|
| 11,621,832 | B2 * | 4/2023 | Nix | H04L 9/0841 |
| | | | | 713/171 |
| 11,936,691 | B2 * | 3/2024 | Faisal | H04L 63/045 |
| 12,231,574 | B2 * | 2/2025 | Wright | H04L 9/3239 |
| 12,519,620 | B2 * | 1/2026 | Myers | H04L 9/0833 |
| 2011/0206200 | A1 * | 8/2011 | Sovio | H04L 9/3073 |
| | | | | 380/30 |
| 2011/0235799 | A1 * | 9/2011 | Sovio | G06F 16/951 |
| | | | | 707/E17.014 |
| 2014/0201520 | A1 * | 7/2014 | Yacobi | H04L 63/045 |
| | | | | 713/158 |
| 2014/0258736 | A1 * | 9/2014 | Merchan | H04L 9/0866 |
| | | | | 713/193 |
| 2015/0088754 | A1 * | 3/2015 | Kirsch | G06F 21/6245 |
| | | | | 713/171 |
| 2016/0269182 | A1 * | 9/2016 | Sriram | H04L 9/0869 |
| 2019/0190713 | A1 * | 6/2019 | Hirano | G09C 1/00 |
| 2020/0351098 | A1 * | 11/2020 | Wentz | H04L 9/3247 |
| 2021/0091952 | A1 * | 3/2021 | Wentz | H04L 9/0866 |
| 2022/0045997 | A1 * | 2/2022 | Gaddam | G06Q 20/12 |
| 2022/0264300 | A1 * | 8/2022 | Nix | H04L 9/0643 |
| 2022/0329438 | A1 * | 10/2022 | Zhang | H04L 9/0643 |
| 2023/0032099 | A1 * | 2/2023 | Zheng | H04L 9/14 |

OTHER PUBLICATIONS

Song, Yubo; Hu, Aiqun. Dynamic Key Distribution System in Ad Hoc Networks. 2008 4th International Conference on Wireless Communications, Networking and Mobile Computing. https://ieeexplore.ieee.org/stamp/stamp.jsp?tp=&arnumber=4679075 (Year: 2008).*

Sultana, Sk. Arshiya et al. Keyless Lightweight Encipher using Homomorphic and Binomial Coefficients for Smart Computing Applications. 2023 2nd International Conference on ViTECoN. https://ieeexplore.ieee.org/stamp/stamp.jsp?tp=&arnumber=10157660 (Year: 2023).*

* cited by examiner

Computer System 500

506

504 Processor

508 Main Memory

502 User Input/Output Interface(s)

503 User Input/Output Device(s)

510 Secondary Memory

512 Hard Disk Memory

514 Removable Storage Drive

518 Removable Storage Unit

520 Interface

522 Removable Storage Unit

Communication Infrastructure

524 Communications Interface

528 Remote Device(s), Network(s), Entity(ies)

526 Communications Path

FAST ATTRIBUTE-BASED ENCRYPTION WITH IMPROVED SECURITY

CROSS-REFERENCE TO RELATED APPLICATION

This application claims the benefit of U.S. Provisional Application Ser. No. 63/588,287 filed Oct. 5, 2023, the content of which is incorporated by reference herein in its entirety.

FIELD OF THE INVENTION

The present disclosure relates to cryptographic systems, and more particularly to fast attribute-based encryption schemes with improved security and efficiency.

BACKGROUND OF THE INVENTION

Attribute-based encryption (ABE) extends classical public-key encryption to support fine-grained access control on encrypted data. ABE has applications in a variety of settings including electronic medical records, messaging systems, online social networks and information-centric networking. Companies already use ABE to distribute private key storage across data centers.

ABE comes in two variants: ciphertext-policy (CP-ABE) and key-policy (KP-ABE), depending on whether access policies are attached to ciphertexts or to keys. In CP-ABE, keys are associated with sets of attributes, and a key is able to recover the message hidden in a ciphertext if and only if the set of attributes satisfy the access policy attached to the ciphertext. KP-ABE is the dual of CP-ABE with ciphertexts attached to attribute sets and keys associated with access policies.

There is a vast body of research on ABE realizing a broad spectrum of trade-offs between efficiency, expressiveness, security and hardness assumptions. Existing schemes support expressive policies described by boolean formula and monotone span programs (MSP), put no restriction on size of policies or attribute sets, allow any arbitrary string such as street addresses to be used as an attribute, and achieve adaptive security.

However, existing schemes achieve incomparable efficiency guarantees, and deciding which one to deploy requires making complex performance trade-offs that depend on the policies that arise in the specific context. Additionally, many schemes have limitations in terms of ciphertext and key sizes, encryption and decryption speeds, and quantitative security guarantees.

Implementing ABE schemes in practice also presents challenges. Considerations include selecting appropriate underlying cryptographic primitives, optimizing performance for different operations, supporting various policy types, and integrating with existing systems and workflows. There is a need for flexible and efficient ABE implementations that can be readily deployed in real-world applications.

As ABE sees increased adoption, there is growing demand for schemes and implementations that provide improved efficiency, stronger security, and greater flexibility to meet the needs of diverse use cases. Addressing these challenges could enable more widespread use of ABE's powerful access control capabilities across a range of domains.

BRIEF SUMMARY OF THE INVENTION

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a method for implementing key-policy attribute-based encryption is provided. The method includes receiving, by one or more processors, a plaintext message to be encrypted, a master public key, and a set of attributes. The method further includes generating, by the one or more processors, a random integer s within a range defined by a prime integer p, wherein the prime integer p is established by a pairing-friendly elliptic curve comprising a first source group $\mathbb{G}_1$, a second source group $\mathbb{G}_2$, and a target group $\mathbb{G}_T$. The method also includes computing, by the one or more processors, a set of attribute encodings by: hashing each attribute in the set of attributes to an element of the first source group $\mathbb{G}_1$, and multiplying each hashed attribute by the random integer s. The method further includes deriving, by the one or more processors, a blinding factor by multiplying a target group element from the master public key by the random integer s. The method also includes generating, by the one or more processors, a masked message by combining the plaintext message with the blinding factor. The method further includes constructing, by the one or more processors, a ciphertext comprising: the masked message, the set of attributes, the set of attribute encodings, and an encoding of the random integer s in the second source group $\mathbb{G}_2$. The method also includes outputting, by the one or more processors, the ciphertext.

According to other aspects of the present disclosure, the method may include one or more of the following features. The method may further comprise executing a key generation routine. The key generation routine may comprise: receiving a master secret key and the master public key from a setup routine, and a key-policy; computing shares of the master secret key with respect to the key-policy using a linear secret-sharing scheme, wherein each share is associated with an attribute in the key-policy; sampling $n_{multiuse}$ random integers between 1 and the prime integer p, where $n_{multiuse}$ is a maximum number of times any attribute appears in the key-policy; masking each share in the first source group using a secure hash of the attribute and the random integers between 1 and the prime integer p, such that no random integer is used twice for the same attribute by maintaining a counter for each attribute; computing a secret key as a concatenation of the masked shares and an encoding of the random integers between 1 and the prime integer p in the second source group and the key-policy; and outputting the secret key. To select a hash function ROH, the processor may pick a random 256-bit key, which is input as a prefix to a SHA-256 hash function. The first source group may be relatively faster than the second source group.

The method may further comprise executing a setup routine. The setup routine may comprise: selecting a random number generator from a library of random number generators, if none have been selected by a user; picking a master secret key msk as a random integer between 1 and the prime integer p; picking a secure hash function ROH; computing the master public key based on the pairing-friendly curve, the hash function, and an encoding of msk as a target group element; and establishing a keystore in a device memory, the keystore comprising storage for the master secret key and the master public key.

The method may further comprise: receiving a ciphertext, wherein the ciphertext comprises a masked message, a set of attributes, a set of attribute encodings, and an encoding of s in the second source group; receiving a secret key, wherein the secret key comprises masked shares and an encoding of random integers between 1 and the prime integer p in the second source group and a key-policy; computing a pairing of the set of attribute encodings in the ciphertext with the encoding of random integers in the secret key; computing a pairing of masked shares in the secret key with the encoding of s in the ciphertext; combining an output of the pairing computations to compute a blinding factor using a linear secret-sharing scheme; combining the blinding factor with the ciphertext to recover the message; and outputting the recovered message. The pairing-friendly curve may be selected from a group consisting of Barreto-Naehrig curves, Barreto-Lynn-Scott curves, and Kachisa-Schaefer-Scott curves. The linear secret-sharing scheme may be based on Shamir's secret sharing or a monotone span program.

According to another aspect of the present disclosure, a system for implementing key-policy attribute-based encryption is provided. The system includes one or more processors and a memory storing instructions that, when executed by the one or more processors, cause the system to perform operations. The operations include receiving a plaintext message to be encrypted, a master public key, and a set of attributes; generating a random integer s within a range defined by a prime integer p, wherein the prime integer p is established by a pairing-friendly elliptic curve comprising a first source group $\mathbb{G}_1$, a second source group $\mathbb{G}_2$, and a target group $\mathbb{G}_T$; computing a set of attribute encodings by: hashing each attribute in the set of attributes to an element of the first source group $\mathbb{G}_1$, and multiplying each hashed attribute by the random integer s; deriving a blinding factor by multiplying a target group element from the master public key by the random integer s; generating a masked message by combining the plaintext message with the blinding factor; constructing a ciphertext comprising: the masked message, the set of attributes, the set of attribute encodings, and an encoding of the random integer s in the second source group $\mathbb{G}_2$; and outputting the ciphertext.

According to other aspects of the present disclosure, the system may include one or more of the following features. The operations may further comprise executing a key generation routine, the key generation routine comprising: receiving a master secret key and the master public key from a setup routine, and a key-policy; computing shares of the master secret key with respect to the key-policy using a linear secret-sharing scheme, wherein each share is associated with an attribute in the key-policy; sampling $n_{multiuse}$ random integers between 1 and the prime integer p, where $n_{multiuse}$ is a maximum number of times any attribute appears in the key-policy; masking each share in the first source group using a secure hash of the attribute and the random integers between 1 and the prime integer p, such that no random integer is used twice for the same attribute by maintaining a counter for each attribute; computing a secret key as a concatenation of the masked shares and an encoding of the random integers between 1 and the prime integer p in the second source group and the key-policy; and outputting the secret key. To select a hash function ROH, the processor may pick a random 256-bit key, which is input as a prefix to a SHA-256 hash function. The first source group may be relatively faster than the second source group.

The operations may further comprise executing a setup routine, the setup routine comprising: selecting a random number generator from a library of random number generators, if none have been selected by a user; picking a master secret key msk as a random integer between 1 and the prime integer p; picking a secure hash function ROH; computing the master public key based on the pairing-friendly curve, the hash function, and an encoding of msk as a target group element; and establishing a keystore in a device memory, the keystore comprising storage for the master secret key and the master public key.

The operations may further comprise: receiving a ciphertext, wherein the ciphertext comprises a masked message, a set of attributes, a set of attribute encodings, and an encoding of s in the second source group; receiving a secret key, wherein the secret key comprises masked shares and an encoding of random integers between 1 and the prime integer p in the second source group and a key-policy; computing a pairing of the set of attribute encodings in the ciphertext with the encoding of random integers in the secret key; computing a pairing of masked shares in the secret key with the encoding of s in the ciphertext; combining an output of the pairing computations to compute a blinding factor using a linear secret-sharing scheme; combining the blinding factor with the ciphertext to recover the message; and outputting the recovered message.

According to another aspect of the present disclosure, a non-transitory computer-readable storage medium storing instructions is provided. When executed by one or more processors, the instructions cause the one or more processors to perform operations for implementing key-policy attribute-based encryption. The operations include receiving a plaintext message to be encrypted, a master public key, and a set of attributes; generating a random integer s within a range defined by a prime integer p, wherein the prime integer p is established by a pairing-friendly elliptic curve comprising a first source group $\mathbb{G}_1$, a second source group $\mathbb{G}_2$, and a target group $\mathbb{G}_T$; computing a set of attribute encodings by: hashing each attribute in the set of attributes to an element of the first source group $\mathbb{G}_1$, and multiplying each hashed attribute by the random integer s; deriving a blinding factor by multiplying a target group element from the master public key by the random integer s; generating a masked message by combining the plaintext message with the blinding factor; constructing a ciphertext comprising: the masked message, the set of attributes, the set of attribute encodings, and an encoding of the random integer s in the second source group $\mathbb{G}_2$; and outputting the ciphertext.

According to other aspects of the present disclosure, the non-transitory computer-readable storage medium may include one or more of the following features. The operations may further comprise executing a key generation routine, the key generation routine comprising: receiving a master secret key and the master public key from a setup routine, and a key-policy; computing shares of the master secret key with respect to the key-policy using a linear secret-sharing scheme, wherein each share is associated with an attribute in the key-policy; sampling $n_{multiuse}$ random integers between 1 and the prime integer p, where $n_{multiuse}$ is a maximum number of times any attribute appears in the key-policy; masking each share in the first source group using a secure hash of the attribute and the random integers between 1 and the prime integer p, such that no random integer is used twice for the same attribute by maintaining a counter for each attribute; computing a secret key as a concatenation of the masked shares and an encoding of the random integers between 1 and the prime integer p in the second source group and the key-policy; and outputting the secret key. To select a hash function ROH, the processor may pick a random 256-bit key, which is input as a prefix to a SHA-256 hash function. The first source group may be relatively faster than the second source group.

The operations may further comprise executing a setup routine, the setup routine comprising: selecting a random number generator from a library of random number generators, if none have been selected by a user; picking a master secret key msk as a random integer between 1 and the prime integer p; picking a secure hash function ROH; computing the master public key based on the pairing-friendly curve, the hash function, and an encoding of msk as a target group element; and establishing a keystore in a device memory, the keystore comprising storage for the master secret key and the master public key.

The operations may further comprise: receiving a ciphertext, wherein the ciphertext comprises a masked message, a set of attributes, a set of attribute encodings, and an encoding of s in the second source group; receiving a secret key, wherein the secret key comprises masked shares and an encoding of random integers between 1 and the prime integer p in the second source group and a key-policy; computing a pairing of the set of attribute encodings in the ciphertext with the encoding of random integers in the secret key; computing a pairing of masked shares in the secret key with the encoding of s in the ciphertext; combining an output of the pairing computations to compute a blinding factor using a linear secret-sharing scheme; combining the blinding factor with the ciphertext to recover the message; and outputting the recovered message.

The foregoing general description of the illustrative embodiments and the following detailed description thereof are merely exemplary aspects of the teachings of this disclosure and are not restrictive.

BRIEF DESCRIPTION OF THE DRAWINGS

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure provides methods and systems for implementing a fast attribute-based encryption (FABEO) scheme. The FABEO scheme is designed to enhance the efficiency, security, and flexibility of cryptographic systems. In some aspects, the FABEO scheme utilizes asymmetric (Type-III) prime-order bilinear groups, which support efficient hashing. This approach allows for the majority of ciphertexts and secret keys to comprise elements in a smaller and faster group, thereby improving the efficiency of the encryption and decryption processes.

In other aspects, the FABEO scheme achieves optimal security bounds against adversaries that obtain an arbitrary number of ciphertexts and keys. This is achieved by considering "generic" adversaries, a widely accepted model that captures all known attacks. The FABEO scheme also supports expressive policies described by boolean formula and monotone span programs (MSP), and puts no restriction on the size of policies or attribute sets.

Furthermore, the FABEO scheme is designed to be flexible and readily deployable in real-world applications. It can be implemented in various settings, including electronic medical records, messaging systems, online social networks, and information-centric networking. The FABEO scheme thus provides a robust and efficient solution for fine-grained access control on encrypted data.

Figure 1:
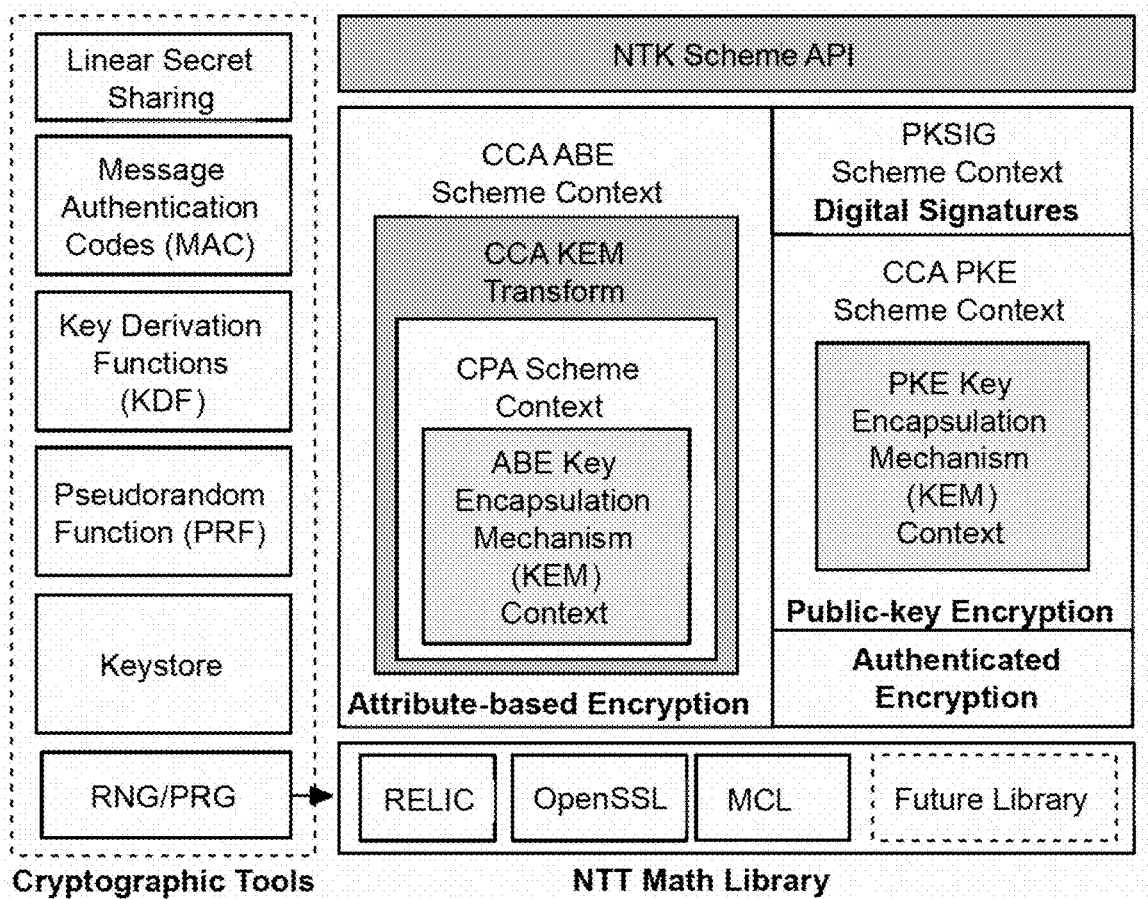
FIG. 1 illustrates a block diagram of a cryptographic system architecture, according to aspects of the present disclosure.

Referring to FIG. 1, in some aspects, the key generation process for the key-policy attribute-based encryption scheme may involve executing a key generation routine. This routine may include receiving a master secret key and a master public key from a setup routine, along with a key-policy. The master public key may further specify a pairing-friendly curve.

The pairing-friendly curve may comprise three groups, including two source groups and one target group. A prime integer 'p' may be established as part of the process. Shares of the master secret key may be computed with respect to the key-policy using a linear secret-sharing scheme. Each share may be associated with an attribute in the key-policy.

In some cases, the key generation routine may involve sampling random integers between 1 and the prime integer 'p'. The number of random integers sampled may be equal to the maximum number of times any attribute appears in the policy. Each share in the first source group may be masked using a secure hash of the attribute and the random integers between 1 and the prime integer 'p'. This ensures that no random integer is used twice for the same attribute by maintaining a counter for each attribute.

The secret key may be computed as a concatenation of the masked shares and an encoding of the random integers between 1 and the prime integer 'p' in the second source group and the key-policy. The secret key may then be outputted as part of the key generation process.

In some embodiments, the first source group may be relatively faster than the second source group. This may enhance the efficiency of the key generation process. The secure hash function used for masking the shares may be selected by picking a random 256-bit key, which will be input as a prefix to a SHA-256 hash function. This may enhance the security of the key generation process.

Referring to FIG. 1, in some aspects, the encryption routine for the key-policy attribute-based encryption scheme may involve receiving a message to be encrypted, a master public key, and a set of attributes. The master public key may be obtained from the setup routine and may specify a pairing-friendly curve.

In some cases, the encryption routine may involve sampling a random integer 's' between 1 and the prime integer 'p'. This random integer 's' may be used in the subsequent steps of the encryption routine.

The encryption routine may also involve hashing every attribute in the set to the first source group. Each hashed attribute may then be multiplied by 's' to generate a set of attribute encodings. These attribute encodings may be used in the computation of the ciphertext.

In some embodiments, the target group element in the master public key may be multiplied by 's' to generate a blinding factor. This blinding factor may be used to mask the message, thereby enhancing the security of the encryption process.

The encryption routine may further involve computing a ciphertext. The ciphertext may comprise the masked message, the set of attributes, the set of attribute encodings, and an encoding of 's' in the second source group. The ciphertext may then be outputted as part of the encryption routine.

In some embodiments, the encryption routine may be executed by a processor 504 in a computer system 500. The processor 504 may be connected to a communication infrastructure 506, which facilitates data transfer between various components of the computer system 500. The processor 504 may also be connected to a main memory 508, which may store the instructions for executing the encryption routine. The main memory 508 may also store the master public key, the set of attributes, and the message to be encrypted.

In some cases, the encryption routine may be performed in a system diagram 900, which comprises several interconnected components centered around a bus 930. The system diagram 900 may include a processing device 902 and a main memory 904, both containing instructions 926 for executing the encryption routine. The processing device 902 may be a graphics processing unit 922, a video processing unit 928, or an audio processing unit 932, all connected to the bus 930. The system diagram 900 may also include a data storage device 918 containing a machine-readable medium 924 with instructions 926 for executing the encryption routine.

In some aspects, the encryption routine may be performed in a distributed manner across multiple computer systems 500 or system diagrams 900. This may enhance the efficiency and scalability of the encryption process.

Referring to FIG. 1, in some aspects, the decryption process for the attribute-based encryption scheme may involve receiving a ciphertext and a secret key. The ciphertext may comprise a masked message, a set of attributes, a set of attribute encodings, and an encoding of a random integer 's' in the second source group. The random integer 's' may be an integer between 1 and a prime integer 'p'. The secret key may comprise masked shares and an encoding of random integers between 1 and the prime integer 'p' in the second source group and a key-policy.

In some cases, the decryption process may involve computing a pairing of the set of attribute encodings in the ciphertext with the encoding of random integers in the secret key. This may involve performing a bilinear operation on the attribute encodings and the random integer encodings. The result of this operation may be a set of paired values that can be used in the subsequent steps of the decryption process.

The decryption process may also involve computing a pairing of masked shares in the secret key with the encoding of 's' in the ciphertext. This may involve performing a bilinear operation on the masked shares and the encoding of 's'. The result of this operation may be a set of paired values that can be used in the subsequent steps of the decryption process.

In some embodiments, the decryption process may involve combining the outputs of the pairing computations to compute a blinding factor using a linear secret-sharing scheme. The blinding factor may be a value that is used to unmask the masked message in the ciphertext. The computation of the blinding factor may involve performing a linear combination of the paired values obtained from the pairing computations.

The decryption process may further involve combining the blinding factor with the ciphertext to recover the message. This may involve performing an operation that removes the effect of the blinding factor from the masked message, thereby revealing the original message. The recovered message may then be outputted as part of the decryption process.

In some embodiments, the decryption process may be executed by a processor 504 in a computer system 500. The processor 504 may be connected to a communication infrastructure 506, which facilitates data transfer between various components of the computer system 500. The processor 504 may also be connected to a main memory 508, which may store the instructions for executing the decryption process. The main memory 508 may also store the ciphertext, the secret key, and the results of the decryption process.

In some cases, the decryption process may be performed in a system diagram 900, which comprises several interconnected components centered around a bus 930. The system diagram 900 may include a processing device 902 and a main memory 904, both containing instructions 926 for executing the decryption process. The processing device 902 may be a graphics processing unit 922, a video processing unit 928, or an audio processing unit 932, all connected to the bus 930. The system diagram 900 may also include a data storage device 918 containing a machine-readable medium 924 with instructions 926 for executing the decryption process.

In some aspects, the decryption process may be performed in a distributed manner across multiple computer systems 500 or system diagrams 900. This may enhance the efficiency and scalability of the decryption process.

Referring to FIG. 1, in some aspects, the setup routine for the attribute-based encryption system may involve executing a setup routine. This routine may include receiving a master secret key and a master public key from a setup routine, and a key-policy. The master public key may further specify a pairing-friendly curve.

The setup routine may also involve selecting a random number generator from a library of random number generators, if none have been selected by a user. This selection process may enhance the randomness and security of the encryption process.

In some cases, the setup routine may involve picking a master secret key, denoted as 'msk', as a random integer between 1 and a prime integer 'p'. This master secret key may serve as the basis for generating other keys in the encryption system.

The setup routine may also involve picking a secure hash function, denoted as 'ROH'. This hash function may be used for masking shares in the key generation process, thereby enhancing the security of the encryption process.

In some embodiments, the setup routine may involve computing a master public key based on the pairing-friendly curve, the hash function, and an encoding of 'msk' as a target group element. This master public key may be used in the encryption and decryption processes.

The setup routine may further involve establishing a keystore in a device memory. The keystore may comprise storage for the master secret key and the master public key. This keystore may provide a secure and efficient way to store and retrieve the keys used in the encryption system.

In some aspects, the setup routine may be executed by a processor 504 in a computer system 500. The processor 504 may be connected to a communication infrastructure 506, which facilitates data transfer between various components of the computer system 500. The processor 504 may also be connected to a main memory 508, which may store the instructions for executing the setup routine. The main memory 508 may also store the master secret key, the master public key, and the key-policy.

In some cases, the setup routine may be performed in a system diagram 900, which comprises several interconnected components centered around a bus 930. The system diagram 900 may include a processing device 902 and a main memory 904, both containing instructions 926 for executing the setup routine. The processing device 902 may be a graphics processing unit 922, a video processing unit 928, or an audio processing unit 932, all connected to the bus 930. The system diagram 900 may also include a data storage device 918 containing a machine-readable medium 924 with instructions 926 for executing the setup routine.

In some aspects, the setup routine may be performed in a distributed manner across multiple computer systems 500 or system diagrams 900. This may enhance the efficiency and scalability of the setup process.

Referring to FIG. 1, in some aspects, the decryption process for the attribute-based encryption scheme may involve receiving a ciphertext and a secret key. The ciphertext may comprise a masked message, a set of attributes, a set of attribute encodings, and an encoding of a random integer 's' in the second source group. The random integer 's' may be an integer between 1 and a prime integer 'p'. The secret key may comprise masked shares and an encoding of random integers between 1 and the prime integer 'p' in the second source group and a key-policy.

In some cases, the decryption process may involve computing a pairing of the set of attribute encodings in the ciphertext with the encoding of random integers in the secret key. This may involve performing a bilinear operation on the attribute encodings and the random integer encodings. The result of this operation may be a set of paired values that can be used in the subsequent steps of the decryption process.

The decryption process may also involve computing a pairing of masked shares in the secret key with the encoding of 's' in the ciphertext. This may involve performing a bilinear operation on the masked shares and the encoding of 's'. The result of this operation may be a set of paired values that can be used in the subsequent steps of the decryption process.

In some embodiments, the decryption process may involve combining the outputs of the pairing computations to compute a blinding factor using a linear secret-sharing scheme. The blinding factor may be a value that is used to unmask the masked message in the ciphertext. The computation of the blinding factor may involve performing a linear combination of the paired values obtained from the pairing computations.

The decryption process may further involve combining the blinding factor with the ciphertext to recover the message. This may involve performing an operation that removes the effect of the blinding factor from the masked message, thereby revealing the original message. The recovered message may then be outputted as part of the decryption process.

In some embodiments, the decryption process may be executed by a processor 504 in a computer system 500. The processor 504 may be connected to a communication infrastructure 506, which facilitates data transfer between various components of the computer system 500. The processor 504 may also be connected to a main memory 508, which may store the instructions for executing the decryption process. The main memory 508 may also store the ciphertext, the secret key, and the results of the decryption process.

In some cases, the decryption process may be performed in a system diagram 900, which comprises several interconnected components centered around a bus 930. The system diagram 900 may include a processing device 902 and a main memory 904, both containing instructions 926 for executing the decryption process. The processing device 902 may be a graphics processing unit 922, a video processing unit 928, or an audio processing unit 932, all connected to the bus 930. The system diagram 900 may also include a data storage device 918 containing a machine-readable medium 924 with instructions 926 for executing the decryption process.

In some aspects, the decryption process may be performed in a distributed manner across multiple computer systems 500 or system diagrams 900. This may enhance the efficiency and scalability of the decryption process.

Referring to FIG. 1, the cryptographic system architecture is designed to facilitate complex cryptographic operations using a combination of specialized tools and mathematical libraries. In some aspects, the system may include a Cryptographic Tools section and a Math Library section, each comprising various components that contribute to the overall functionality of the system.

The Cryptographic Tools section may include components such as Linear Secret Sharing, Message Authentication Codes (MAC), Key Derivation Functions (KDF), Pseudo-random Function (PRF), Keystore, and RNG/PRG (Random Number Generator/Pseudo-Random Generator). These components may be used to generate keys, authenticate messages, derive keys from a master key, generate pseudorandom numbers, and store keys, among other functions.

The Math Library section may include components such as RELIC, OpenSSL, and MCL, with a placeholder for a Future Library. These components may provide mathematical functions and algorithms that are used in the cryptographic operations of the system.

The system may also include various encryption scheme contexts, such as the CCA ABE Scheme Context, the PKSIG Scheme Context for Digital Signatures, and the CCA PKE Scheme Context. These contexts may define the encryption schemes used in the system and may include components such as the CCA KEM Transform, the CPA Scheme Context, and the ABE Key Encapsulation Mechanism (KEM) Context.

In some cases, the system may incorporate Attribute-based Encryption and Authenticated Encryption functionalities. These functionalities may provide fine-grained access control and authentication for encrypted data.

The system architecture may also include a Scheme API, which encompasses several nested components. The Scheme API may serve as the interface for the encryption schemes and may facilitate the interaction between the Cryptographic Tools, the Math Library, and the encryption scheme contexts.

In some embodiments, the RNG/PRG component from the Cryptographic Tools section may have a connection or data flow to the Math Library section. This connection may indicate that the RNG/PRG component uses functions or algorithms from the Math Library section.

The system architecture may allow for data processing, storage, and communication with both local components and remote entities. The various memory components provide different storage options, while the communications interface enables interaction with external systems.

In some aspects, the decryption process for the attribute-based encryption scheme may involve combining an output of the pairing computations to compute a blinding factor using a linear secret-sharing scheme. The blinding factor may be a value that is used to unmask the masked message in the ciphertext. The computation of the blinding factor may involve performing a linear combination of the paired values obtained from the pairing computations.

The decryption process may further involve combining the blinding factor with the ciphertext to recover the message. This may involve performing an operation that removes the effect of the blinding factor from the masked message, thereby revealing the original message. The recovered message may then be outputted as part of the decryption process.

Referring to FIG. 1, in some aspects, the setup routine for the attribute-based encryption system may involve executing a setup routine. This routine may include receiving a master secret key and a master public key from a setup routine, and a key-policy. The master public key may further specify a pairing-friendly curve.

The setup routine may also involve selecting a random number generator from a library of random number generators, if none have been selected by a user. This selection process may enhance the randomness and security of the encryption process.

In some cases, the setup routine may involve picking a master secret key, denoted as 'msk', as a random integer between 1 and a prime integer 'p'. This master secret key may serve as the basis for generating other keys in the encryption system.

The setup routine may also involve picking a secure hash function, denoted as 'ROH'. This hash function may be used for masking shares in the key generation process, thereby enhancing the security of the encryption process.

In some embodiments, the setup routine may involve computing a master public key based on the pairing-friendly curve, the hash function, and an encoding of 'msk' as a target group element. This master public key may be used in the encryption and decryption processes.

The setup routine may further involve establishing a keystore in a device memory. The keystore may comprise storage for the master secret key and the master public key. This keystore may provide a secure and efficient way to store and retrieve the keys used in the encryption system.

In some aspects, the setup routine may be executed by a processor 504 in a computer system 500. The processor 504 may be connected to a communication infrastructure 506, which facilitates data transfer between various components of the computer system 500. The processor 504 may also be connected to a main memory 508, which may store the instructions for executing the setup routine. The main memory 508 may also store the master secret key, the master public key, and the key-policy.

In some cases, the setup routine may be performed in a system diagram 900, which comprises several interconnected components centered around a bus 930. The system diagram 900 may include a processing device 902 and a main memory 904, both containing instructions 926 for executing the setup routine. The processing device 902 may be a graphics processing unit 922, a video processing unit 928, or an audio processing unit 932, all connected to the bus 930. The system diagram 900 may also include a data storage device 918 containing a machine-readable medium 924 with instructions 926 for executing the setup routine.

In some aspects, the setup routine may be performed in a distributed manner across multiple computer systems 500 or system diagrams 900. This may enhance the efficiency and scalability of the setup process.

Figure 2:
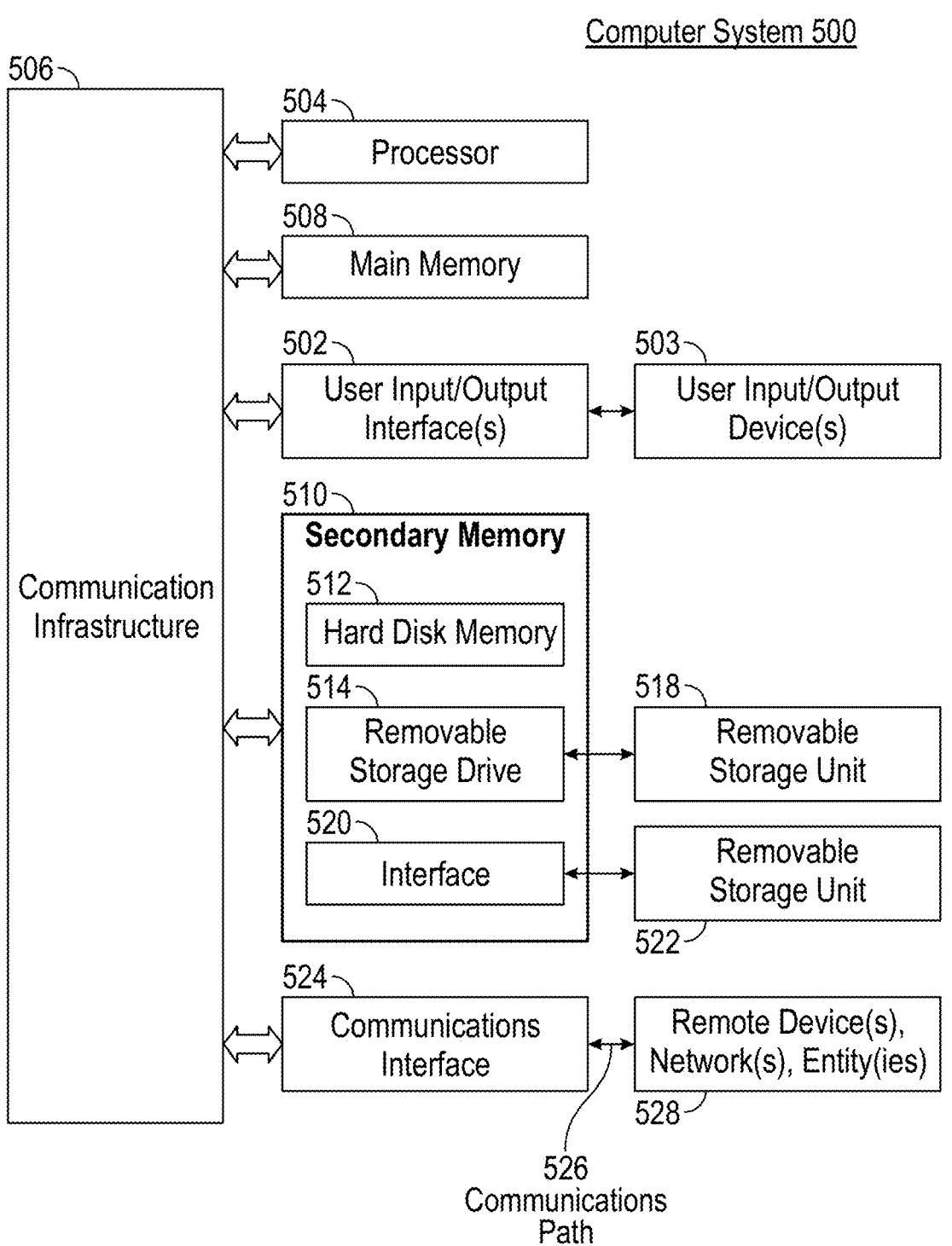
FIG. 2 illustrates a block diagram of a computer system, in accordance with example embodiments.

Referring to FIG. 2, the system diagram 900 illustrates a computer system architecture that may be used to implement the attribute-based encryption scheme. The system diagram 900 includes several interconnected components centered around a bus 930, which serves as the central communication pathway, connecting all components and facilitating data transfer between them.

In some aspects, the system diagram 900 includes a processing device 902, which may be a central processing unit or a graphics processing unit. The processing device 902 may be configured to execute instructions 926 for performing various operations, including the key generation routine, the encryption routine, and the decryption process of the attribute-based encryption scheme. The instructions 926 may be stored in a main memory 904 or a data storage device 918, which contains a machine-readable medium 924.

In some cases, the key generation routine may involve receiving a master secret key and a master public key from a setup routine, and a key-policy. The master public key may further specify a pairing-friendly curve. The key generation routine may also involve computing shares of the master secret key with respect to the key-policy using a linear secret-sharing scheme, wherein each share is associated with an attribute in the key-policy. The key generation routine may further involve sampling random integers between 1 and a prime integer 'p', where the number of random integers sampled is equal to the maximum number of times any attribute appears in the policy.

In some embodiments, the system diagram 900 may include a main memory 904, which may store the instructions for executing the encryption routine. The main memory 904 may also store the master public key, the set of attributes, and the message to be encrypted. The encryption routine may involve receiving a message to be encrypted, a master public key, and a set of attributes. The encryption routine may also involve sampling a random integer 's' between 1 and the prime integer 'p', hashing every attribute in the set to the first source group, and multiplying by 's' to generate a set of attribute encodings.

In some aspects, the system diagram 900 may include a data storage device 918, which may contain a machine-readable medium 924 with instructions 926 for executing the decryption process. The decryption process may involve receiving a ciphertext and a secret key, computing a pairing of the set of attribute encodings in the ciphertext with the encoding of random integers in the secret key, and combining the outputs of the pairing computations to compute a blinding factor using a linear secret-sharing scheme.

In some cases, the setup routine may involve selecting a random number generator from a library of random number generators, if none have been selected by a user. The setup routine may also involve picking a master secret key, denoted as 'msk', as a random integer between 1 and a prime integer 'p'. The setup routine may further involve computing a master public key based on the pairing-friendly curve, the hash function, and an encoding of 'msk' as a target group element. The setup routine may also involve establishing a keystore in a device memory, such as main memory 904 or data storage device 918. The keystore may provide a secure and efficient way to store and retrieve the keys used in the encryption system.

In some aspects, the operations of the attribute-based encryption scheme may be performed in a distributed manner across multiple system diagrams 900. This may enhance the efficiency and scalability of the encryption and decryption processes.

Referring to FIG. 2, the system diagram 900 further illustrates the data storage capabilities of the computer system architecture that may be used to implement the attribute-based encryption scheme. The system diagram 900 includes a data storage device 918, which may be a hard disk drive, a solid-state drive, or any other type of non-volatile storage device. The data storage device 918 may contain a machine-readable medium 924 on which is stored one or more sets of instructions 926. These instructions 926 may embody the operations of the attribute-based encryption scheme, including the key generation routine, the encryption routine, and the decryption process.

In some aspects, the data storage device 918 may be configured to store libraries of executable code. These libraries may include various cryptographic algorithms, mathematical functions, and other tools that are used in the attribute-based encryption scheme. For example, the libraries may include algorithms for generating random numbers, hashing attributes, computing pairings, and performing linear secret-sharing schemes. The libraries may also include mathematical functions for performing operations in the source groups and the target group of the pairing-friendly curve.

In some cases, the data storage device 918 may also store the master secret key and the master public key generated by the setup routine. These keys may be stored in a secure manner, such as in an encrypted format or in a protected area of the data storage device 918. The data storage device 918 may also store the secret keys generated by the key generation routine and the ciphertexts generated by the encryption routine.

In some embodiments, the data storage device 918 may be configured to store libraries of executable code for a key-policy attribute-based encryption routine. This routine may include the key generation routine, the encryption routine, and the decryption process. The libraries may include algorithms for receiving a master secret key and a master public key from a setup routine, computing shares of the master secret key with respect to a key-policy, masking each share using a secure hash of an attribute and random integers, and computing a secret key as a concatenation of the masked shares and an encoding of the random integers.

In some aspects, the data storage device 918 may be configured to store libraries of executable code for attribute-based decryption. This routine may include receiving a ciphertext and a secret key, computing a pairing of attribute encodings in the ciphertext with the encoding of random integers in the secret key, computing a pairing of masked shares in the secret key with the encoding of a random integer in the ciphertext, combining the outputs of the pairing computations to compute a blinding factor, combining the blinding factor with the ciphertext to recover a message, and outputting the message.

In some cases, the instructions 926 stored on the machine-readable medium 924 may be executed by the processing device 902. The processing device 902 may be a central processing unit, a graphics processing unit, or any other type of processing device. The processing device 902 may be connected to the bus 930, which facilitates data transfer between the various components of the system diagram 900. The processing device 902 may also be connected to the main memory 904, which may store temporary data used in the execution of the instructions 926.

Figure 3:
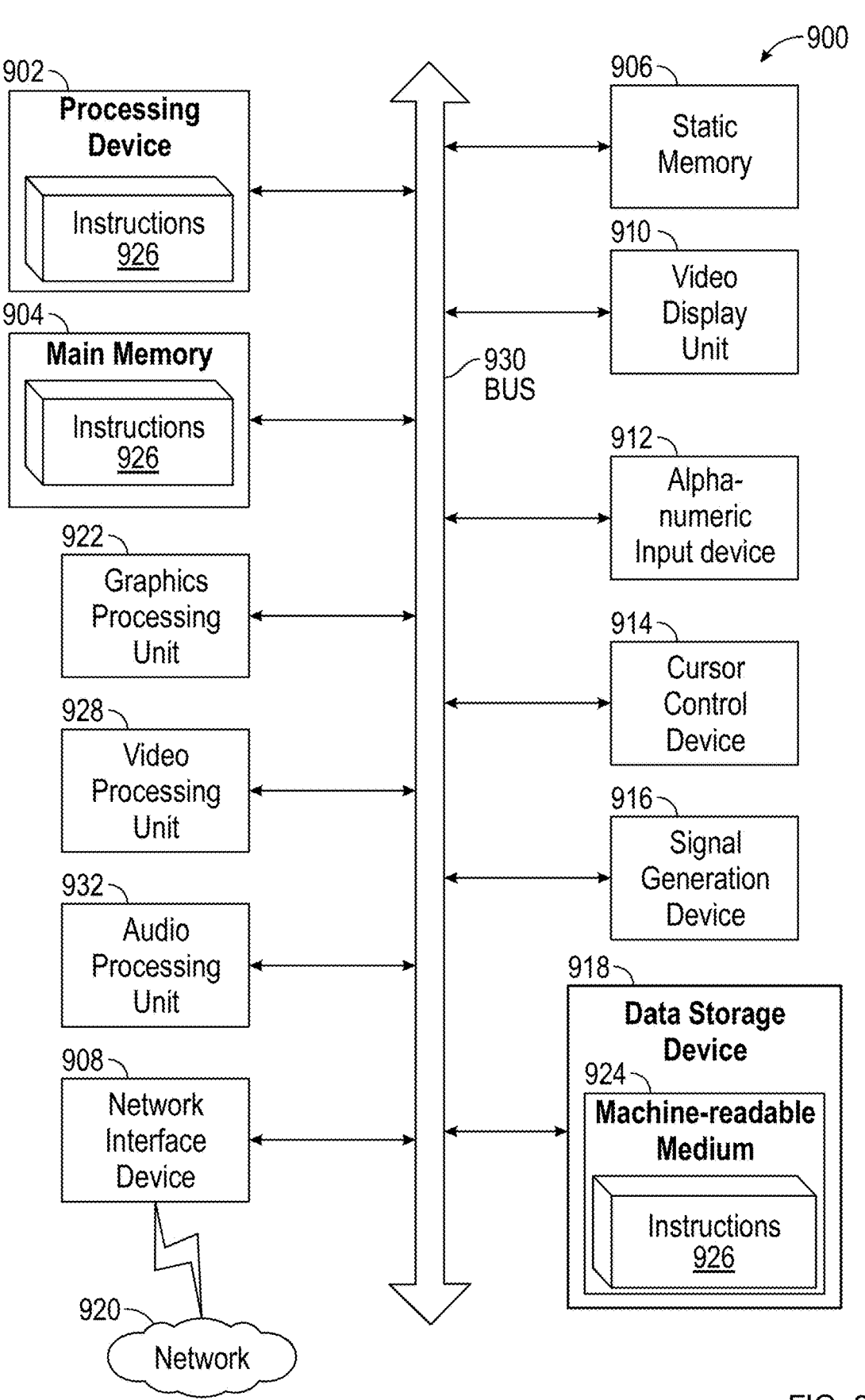
FIG. 3 illustrates a block diagram of another computer system, according to an embodiment of the present disclosure.

Referring to FIG. 3, the computer system 500 illustrates an architecture that may be used to implement the attribute-based encryption scheme. The computer system 500 includes various interconnected components that facilitate data processing, storage, and communication.

In some aspects, the computer system 500 includes a processor 504, which may be a central processing unit or a graphics processing unit. The processor 504 may be configured to execute instructions for performing various operations, including the key generation routine, the encryption routine, and the decryption process of the attribute-based encryption scheme. The processor 504 may also be connected to a communication infrastructure 506, which facilitates data transfer between various components of the computer system 500.

The computer system 500 may also include a main memory 508, such as random-access memory (RAM). Main memory 508 may include one or more levels of cache. Main memory 508 may have stored therein control logic (i.e., computer software, instructions, etc.) and/or data. The main memory 508 may store the instructions for executing the encryption routine. The main memory 508 may also store the master public key, the set of attributes, and the message to be encrypted.

In addition to the main memory 508, the computer system 500 may include a secondary memory 510. The secondary memory 510 may include, for example, a hard disk memory 512 and/or a removable storage drive 514. The removable storage drive 514 may interact with a removable storage unit 518. The removable storage unit 518 may include a computer-usable or readable storage device having stored thereon computer software (control logic) and/or data. The removable storage drive 514 may read from and/or write to the removable storage unit 518.

The secondary memory 510 may also include an interface 520, which is linked to another removable storage unit 522. The interface 520 and the removable storage unit 522 provide additional storage options for the computer system 500. These storage options may be used to store the master secret key, the master public key, the secret keys generated by the key generation routine, and the ciphertexts generated by the encryption routine.

The computer system 500 may further include a communications interface 524. The communications interface 524 may enable the computer system 500 to communicate and interact with external devices, networks, entities, etc. (individually and collectively referenced as remote devices, networks, entities 528). For example, the communications interface 524 may allow the computer system 500 to communicate with external or remote devices, networks, entities 528 over a communications path 526, which may be wired and/or wireless, and which may include any combination of LANs, WANs, the Internet, etc. Control logic and/or data may be transmitted to and from the computer system 500 via the communications path 526.

In some cases, the operations of the attribute-based encryption scheme may be performed in a distributed manner across multiple computer systems 500. This may enhance the efficiency and scalability of the encryption and decryption processes. For example, the key generation routine may be executed by a processor 504 in one computer system 500, while the encryption routine may be executed by a processor 504 in another computer system 500. Similarly, the decryption process may be executed by a processor 504 in one computer system 500, while the setup routine may be executed by a processor 504 in another computer system 500. This distributed approach may allow for parallel processing of the encryption and decryption processes, thereby improving the overall performance of the attribute-based encryption scheme.

In some embodiments, the computer system 500 may be a part of a larger system, such as a system diagram 900. The system diagram 900 may include several interconnected components centered around a bus 930. The system diagram 900 may include a processing device 902 and a main memory 904, both containing instructions 926 for executing the encryption routine. The processing device 902 may be a graphics processing unit 922, a video processing unit 928, or an audio processing unit 932, all connected to the bus 930. The system diagram 900 may also include a data storage device 918 containing a machine-readable medium 924 with instructions 926 for executing the encryption routine. The system diagram 900 and the computer system 500 may work together to implement the attribute-based encryption scheme. For example, the system diagram 900 may handle the encryption routine, while the computer system 500 may handle the decryption process. This may allow for a more efficient and scalable implementation of the attribute-based encryption scheme.

Embodiments of the invention, also referred to herein as fast attribute-based encryption with optimal security (FABEO), includes new pairing-based KP-ABE and CP-ABE schemes achieving properties (1)-(4), with improved efficiency and quantitatively stronger security guarantees. FABEO uses asymmetric (Type-III) prime-order bilinear groups ($\mathbb{G}_1$, $\mathbb{G}_2$, $\mathbb{G}_T$) which support efficient hashing to $\mathbb{G}_1$. Ciphertexts and secret keys in FABEO comprise mostly of elements in the smaller and faster group $\mathbb{G}_1$, plus 1 or 2 elements in $\mathbb{G}_2$. Computation for key generation, encryption and decryption are mostly carried out in $\mathbb{G}_1$, with 2 to 3 pairings for decryption. Optimal security bounds can be proven for FABEO against adversaries that get an arbitrary number of ciphertexts and keys: in particular, when instantiated over the popular BLS12-381 curve, FABEO achieves close to 128-bit security.

FABEO subsumes BSW, FAME and ABGW on all parameters of practical interest. It improves upon the ciphertext and key sizes of all three schemes, as well as the running times. In particular, FABEO ciphertexts are 66% smaller; encryption is (at least) 33% faster; and decryption uses fewer pairings. FABEO also supports multi-use of attributes like in BSW and ABGW (without an a-prior bound during set-up), with a small additive overhead in the multi-use parameter.

FABEO achieves properties (2) and (3) by hashing attributes to $\mathbb{G}_1$; smaller ciphertext/key sizes and fast decryption via randomness reuse (in CP-ABE ciphertexts and KP-ABE keys); and adaptive security without efficiency penalties by considering "generic" adversaries, a widely accepted model that captures all known attacks. FABEO is the first to combine these techniques in a single design, along with a novel analysis establishing optimal security.

Implementation and evaluation. As a non-limiting example, FABEO can be implemented in the Charm framework. Experiments validate the theoretical analysis showing that FABEO improves on the performance of BSW, FAME and ABGW, for all of key generation, encryption and decryption. FABEO compares favorably even against the Waters CP-ABE and GPSW KP-ABE, even though, in some embodiments, these schemes do not achieve property (3).

Some or all of the computations can be performed on an ordinary laptop, or using the toolkit and libraries described herein, and practical results can be achieved, even for large attribute sets and policies. Specifically for the CP-ABE with the MNT224 curve, set-up takes less than 0.02 s, and it takes around 0.09 s to generate a key for 100 attributes, and 0.18 s to encrypt data under a policy that requires all 100 attributes. Decryption then takes only 0.02 s. As a comparison, the ABGW CP-ABE scheme takes 0.63 s to generate a key for the same number of attributes, 0.33 s to encrypt and 0.48 s to decrypt. In FAME, decryption takes 0.03 s, and key generation and encryption are slower than ABGW.

In some embodiments, the invention comprises:

implementations of KP-ABE and CP-ABE schemes for MSP with improved efficiency guarantees and with optimal, adaptive security with multiple challenge ciphertexts.

implementations of KP-ABE and CP-ABE schemes for MSP which can be evaluated for their performance for various parameters; and implementations of a KP-ABE for DFA with optimal, adaptive security in the GGM.

Example embodiments of the CP-ABE and KP-ABE schemes are described below.

0.1 CP-ABE and KP-ABE Schemes

Define $\rho(i) := |\{z | \pi(z) = \pi(i), z \leq i\}|$ and $\tau = \max_{i \in [n_1]} \rho(i)$ corresponding to maximum number of times an attribute is used in M.

CP-ABE

Setup($1^\lambda$). Run GroupGen($1^\lambda$) to obtain $\mathcal{G} := (p, \mathbb{G}_1, \mathbb{G}_2, \mathbb{G}_t, e, g_1, g_2)$. Pick $$\alpha \xleftarrow{\$} \mathbb{Z}_p$$

and a hash function H: $[\mathcal{U} + 1] \to \mathbb{G}_1$. Compute the master public key as $$mpk := (\mathcal{G}, H, e(g_1, g_2)^\alpha)$$

Let $msk := \alpha$ be the master secret key.

KeyGen(msk, $\mathcal{S} \subseteq \mathcal{U}$). Pick $$r \xleftarrow{\$} \mathbb{Z}_p.$$

Compute $$sk_1 := g_1^\alpha \cdot H(|\mathcal{U}| + 1)^r$$

$$sk_{2,u} := H(u)^r$$

$$sk_3 := g_2^r$$

for each $u \in \mathcal{S}$ Output $sk := \{sk_1, sk_{2,u}\}_{u \in \mathcal{S}}, sk_3)$.

Enc(mpk, (M, $\pi$)). Pick $$s_1 \xleftarrow{\$} \mathbb{Z}_p, v \xleftarrow{\$} \mathbb{Z}_p^{n_2 - 1}, s' \xleftarrow{\$} \mathbb{Z}_p^\tau.$$

Compute $$ct_1 := g_2^{s_1} \qquad ct_{2,j} := g_2^{s'[j]}$$

for $j \in [\tau]$, as well as $$ct_{3,i} := H(|\mathcal{U}| + 1)^{M_i(s_1 \| v)^T} \cdot H(\pi(i))^{s'[\rho(i)]}$$

for each row $i \in [n_1]$. Output $ct := (ct_1, (ct_{2,j})_{j \in [\tau]}, (ct_{3,i})_{i \in [n_1]})$ and $d := e(g_1, g_2)^{\alpha s_1}$.

Dec(mpk, $(M, \pi)$, $\mathcal{S}$, ct, sk). If $\mathcal{S}$ satisfies $(M, \pi)$, there exist constants $\{\gamma_i\}_{i \in I}$ s.t. $\Sigma_{i \in I} \gamma_i M_i = (1, 0, \ldots, 0)$. Reconstruct d by computing $$e(sk_1, ct_1) \cdot \frac{\prod_{j \in [\tau]} e\left(\prod_{i \in I, \rho(i)=j} (sk_{2,\pi(i)})^{\gamma_i}, ct_{2,j}\right)}{e\left(\prod_{i \in I} (ct_{3,i})^{\gamma_i}, sk_3\right)}$$

and output the result.

KP-ABE

Setup($1^\lambda$). Run GroupGen($1^\lambda$) to obtain $\mathcal{G} :=$ (p, $\mathbb{G}_1$, $\mathbb{G}_2$, $\mathbb{G}_T$, e, $g_1$, $g_2$). Pick $$\alpha \xleftarrow{\$} \mathbb{Z}_p$$

and a hash function H: $\mathcal{U} \to \mathbb{G}_1$. Compute the master public key as $$mpk := (\mathcal{G}, H, e(g_1, g_2)^\alpha)$$

Let msk $\alpha$ $\alpha$ be the master secret key.

KeyGen(msk, $(M, \pi)$). Pick $$r' \xleftarrow{\$} \mathbb{Z}_p^\tau, v \xleftarrow{\$} \mathbb{Z}_p^{n_2 - 1}.$$

Compute $$sk_{1,j} := g_2^{r'_{[j]}}$$

for $j \in [\tau]$, as well as $$sk_{2,i} := g_1^{M_i(\alpha \| v)^T} \cdot H(\pi(i))^{r'_{[\rho(i)]}}$$

for each row $i \in [n_1]$. Output sk $:= ((sk_{1,j})_{j \in [\tau]}, (sk_{2,i})_{i \in [n_1]})$.

Enc(mpk, $\mathcal{S} \subseteq \mathcal{U}$).

$$\text{Pick } s \xleftarrow{\$} \mathbb{Z}_p.$$

For each $u \in \mathcal{S}$ compute $$ct_{1,u} := H(u)^s \quad ct_2 := g_2^s$$

Output ct $\alpha$ $((ct_{1,u})_{u \in S}, ct_2)$ and d $\alpha$ $e(g_1, g_2)^{\alpha s}$.

Dec(mpk, S, $(M, \pi)$, ct, sk). If S satisfies $(M, \pi)$, there exist constants $\{\gamma_i\}_{i \in I}$ s.t. $\Sigma_{i \in I} \gamma_i M_i = (1, 0, \ldots, 0)$. Reconstruct d by computing $$\frac{\left(\prod_{i \in I} (sk_{2,i})^{\gamma_i}, ct_2\right)}{\prod_{j \in [\tau]} e\left(\prod_{i \in I, \rho(i)=j} (ct_{1,\pi(i)})^{\gamma_i}, sk_{1,j}\right)}$$

and output the result.

0.2 Technical Detailed Description

Let ($\mathbb{G}_1$, $\mathbb{G}_2$, $\mathbb{G}_T$) be an (asymmetric) bilinear group of prime order p, along with a pairing e: $\mathbb{G}_1 \times \mathbb{G}_2 \to \mathbb{G}_T$ and generators $g_1$, $g_2$ for $\mathbb{G}_1$, $\mathbb{G}_2$ respectively. In general, the bit sizes of group elements in $\mathbb{G}_2$ are 2-3 times that of $\mathbb{G}_1$ and group operations in $\mathbb{G}_2$ take (at least) twice as much time. In addition, we can securely hash into $\mathbb{G}_1$ at the cost of roughly one exponentiation in $\mathbb{G}_1$.

High-level design. A high-level overview of the KP-ABE scheme follows. An MSP is given by a matrix M and a function $\pi$ that maps each row of M to an attribute (for this overview, assume $\pi$ is injective, i.e., no attribute multi-use). We design the ciphertexts and secret keys so that for each row i in M such that $\pi(i)$ appears in the attribute set, decryption will compute $$e(g_1, g_2)^{s_1 \alpha_i} \qquad (1)$$

where $\alpha_i$ is a share of the master secret key $\alpha$ and $s_1 \leftarrow \mathbb{Z}_p$ is the encryption randomness. The values in (1) can then be combined to recover the blinding factor $e(g_1, g_2)^{s_1 \alpha}$.

To realize the above invariant, we have $$\left(g_2^{s_1}, H(\pi(i))^{s_1}\right) \in ct, \quad \left(g_2^r, g_1^{\alpha_i} H(\pi(i))^r\right) \in sk$$

so that we can compute (1) using $$e\left(g_1^{\alpha_i} H(\pi(i))^r, g_2^{s_1}\right) / e(H(\pi(i))^{s_1}, g_2^r).$$

In addition, we use the same r across all the rows in M, to keep the key size small. This way, we can also carry out decryption using two pairings (by writing $$\prod_i (e(g_1, g_2)^{s_1 \alpha_i})^{\gamma_i} \text{ as}$$

$$e\left(\prod_i (g_1^{\alpha_i} H(\pi(i))^r)^{\gamma_i}, g_2^{s_1}\right) \cdot e\left(\prod_i (H(\pi(i))^{s_1})^{\gamma_i}, g_2^r\right)^{-1}$$

and with most of the computation in the faster group $\mathbb{G}_1$. In contrast, BSW uses a different $r_i$ for each share, namely $$\left(g_2^{r_i}, g_1^{\alpha_i} H(\pi(i))^{r_i}\right) \in sk$$

(here, we are describing the KP-ABE analogue of the BSW CP-ABE). This incurs a factor 2 blow-up in key size, and decryption requires computing a pairing for each row of M.

ABGW uses $$\left(g_1^{s-s_i}, g_1^{s_i(b_1 + \pi(i)b_2)}\right) \in ct, \quad \left(g_2^{\frac{\alpha_i}{b_1 + \pi(i)b_2}}, g_2^{\alpha_i}\right) \in sk$$

where $$g_1^{b_1}, g_1^{b_2}$$

comes from mpk. This incurs (at least) a factor 2 blow-up in ciphertext and key sizes, and an extra exponentiation per attribute during encryption. Decryption requires computing a pairing for each attribute. $\mathbb{G}_2^3$ FAME replaces $$g_2^{s_1}, g_2^{r}$$

with DLIN-tuples in $\mathbb{G}_2^3$ in order to achieve security under the DLIN assumption using the dual system encryption framework. Overall, this incurs a factor 3 blow-up in ciphertext and key sizes, as well as a factor 3-6 blow-up in running time for encryption and key generation.

Our CP-ABE scheme is conceptually the dual of our KP-ABE, though algebraically more intricate and less intuitive (the same holds for BSW, FAME, and ABGW). Briefly, instead of (1), decryption computes $e(g_1, g_2)^{\mu_i b' r}$ where $\mu_i$ is a share of the encryption randomness $$s_1; g_1^{b'}$$

is specified in the public key; and r comes from key generation randomness. These values can then be combined to compute $e(g_1, g_2)^{s_1 b' r}$, which is in turn used to recover the blinding factor $e(g_1, g_2)^{s_1 \alpha}$.

We now describe the key differences between our framework and the one in ABGW:

The syntax for PES-ABE is different: (i) both $ct_x$ and $sk_y$ contain elements from both $\mathbb{G}_1$ and $\mathbb{G}_2$, and (ii) we generate $$g_1^b$$

using a random oracle.

We introduce a strengthening of (1,1) symbolic security where we essentially require that all of $$[\alpha c_x^1(s)]_T$$

are pseudorandom, and not just $[\alpha s_1]_T$. Our notion is also weaker in that the proof only needs to reason about the terms $$e(g_1, g_2)^{c_x^1(s \otimes b) \otimes k_y^2(r)} \text{ and } e(g_1, g_2)^{k_y^1(\alpha, r, b \otimes r) \otimes c_x^2(s)}.$$

The ABGW KP-ABE and CP-ABE schemes for MSP do not satisfy the syntax of a PES-ABE since $$k_y^2$$

computes rational functions with linear functions b in the denominator and therefore proving security of these schemes require directly establishing strong symbolic security;

The analogue of strong symbolic security in ABGW in Steps 2 and 3 considers only a single challenge ciphertext.

We achieve a security bound of $O(t^2/p)$ in Step 3, whereas ABGW achieves $O(t^3/p)$. Our proof crucially relies on the fact that $$c_x^1, c_x^2, k_y^1, k_y^2$$

compute functions of degree at most 2 in the inputs so that we only need to apply Schwartz-Zippel to constant-degree polynomials. The proof in ABGW applies Schwartz-Zippel to polynomials of degree t in order to "clear the denominators" across t keys.

1 Notation

For integers m, n where m<n, [m, n] denotes the set m, m+1, . . . , n. For m=1, we simply write [n]. For a prime p, let $\mathbb{Z}_p$ denote a set [0, p−1], where addition and multiplication are computed modulo p. For a set $\mathcal{S}$, $$s \overset{\$}{\leftarrow} \mathcal{S}$$

denotes that s is sampled uniformly and independently at random from $\mathcal{S}$. $y \leftarrow \mathcal{A}(x_1, x_2, \ldots)$ denotes that on input $x_1, x_2, \ldots$ the probabilistic algorithm. $\mathcal{A}$ returns y. $\mathcal{A}^{\mathcal{O}}$ denotes that algorithm $\mathcal{A}$ has access to oracle $\mathcal{O}$. An adversary is a probabilistic algorithm. A probabilistic algorithm is called efficient or PPT if its running time is bounded by some polynomial in the length of its input.

We use lower case bold-face letters for row vectors, where $\|$ denotes concatenation of row vectors. v[i] denotes the i-th coordinate of the vector v. Given a vector v of polynomials of length m over $\mathbb{Z}_p$, we write span(v) to denote $\{v \cdot e^T: e \in \mathbb{Z}_p^m\}$. Formal variables are marked with a tilde. We write $\tilde{v} \leftarrow Var^n$ to pick n formal variables.

1.1 Pairing Groups

Let GroupGen be a PPT algorithm that takes a security parameter $1^\lambda$ as input and returns a group description $\mathcal{G} \alpha (p, \mathbb{G}_1, \mathbb{G}_2, \mathbb{G}_T, e, g_1, g_2)$, where p is a prime of $\Theta(\lambda)$ bits, $\mathbb{G}_1$, $\mathbb{G}_2$ and $\mathbb{G}_T$ are cyclic groups of order p, $e: \mathbb{G}_1 \times \mathbb{G}_2 \to \mathbb{G}_T$ is a non-degenerate bilinear map (also called pairing) and $g_1$ resp. $g_2$ are generators of $\mathbb{G}_1$ resp. $\mathbb{G}_2$. The generator $g_T$ of $\mathbb{G}_T$ can be computed as $e(g_1, g_2)$. We require that the group operations in $\mathbb{G}_1$, $\mathbb{G}_2$, $\mathbb{G}_T$ and the bilinear map e are computable in deterministic polynomial time in $\lambda$. In this work, we only consider asymmetric (or Type-III) pairing groups where there exists no efficiently computable homomorphism between $\mathbb{G}_1$ and $\mathbb{G}_2$. In some cases we will use implicit representation of group elements: for a vector v over $\mathbb{Z}_p$, we define $$[v]_1 := g_s^v$$

for $s \in \{1, 2, T\}$, where exponentiation is carried out component-wise.

1.2 Attribute-Based Encryption

Herein, we use a KEM-style definition of ABE. However note that it is implied by the corresponding definition in the PKE setting.

Syntax. An attribute-based encryption (ABE) scheme for some class P consists of four algorithms:

Setup($1^\lambda$, P)→(mpk, msk). The setup algorithm gets as input the security parameter $1^\lambda$ and class description P. It outputs the master public key mpk and the master secret key msk. We assume mpk defines the key space $\mathcal{K}$.

Enc(mpk, x)→(ct$_x$, d). The encryption algorithm gets as input mpk and an input x. It outputs a ciphertext ct$_x$ and an encapsulated key d∈ $\mathcal{K}$.

KeyGen(mpk, msk, y)→sk$_y$. The key generation algorithm gets as input mpk, msk and y∈P. It outputs a secret key sk$_y$.

Dec(mpk, x, y, ct$_x$, sk$_y$)→m. The decryption algorithm gets as input sk$_y$ and ct$_x$, such that P(x,y)=1 along with mpk. It outputs a key d.

Correctness. For all input x and y with P(x)=1, we require $$Pr\left[Dec(mpk, x, y, ct_x, sk_y) = d: \begin{matrix} (mpk, msk) \leftarrow \text{Setup}(1^\lambda, P) \\ sk_y \leftarrow KeyGen(mpk, msk, y) \\ (ct_x, d) \leftarrow Enc(mpk, x) \end{matrix}\right] = 1.$$

Many-Ciphertext CPA Security. We define security by a game between a challenger and an adversary $\mathcal{A}$. The challenger picks a random challenge bit $\beta$ and provides the following oracles to $\mathcal{A}$.

Set oracle $\mathcal{O}_{mpk}$: This oracle can only be queried once and it must be the first query. The challenger runs Setup to obtain (msk, mpk) and outputs mpk to $\Omega$.

Ciphertext (or challenge) oracle $\mathcal{O}_{ct}$: On the i-th query, $\mathcal{A}$ provides x$_i \in \mathcal{X}$. The challenger runs $$\left(ct_i, d_i^{(0)}\right) \leftarrow Enc(mpk, x_i),$$

chooses a random key $$d_i^{(1)} \xleftarrow{\$} \mathcal{K}$$

and outputs $$\left(ct_i, d_i^{(\beta)}\right).$$

Secret key oracle $\mathcal{O}_{sk}$: On the j-th query, $\mathcal{A}$ provides y$_j \in \mathcal{Y}$. The challenger runs sk$_j$←KeyGen(msk, y$_j$) and outputs sk$_j$.

$\mathcal{O}_{ct}$ and $\mathcal{O}_{sk}$ can be queried adaptively and an arbitrary polynomial number of times. Finally, $\mathcal{A}$ outputs a bit $\beta$'. We say that $\mathcal{A}$ wins the game if $\beta=\beta$' and P(x$_i$, y$_j$)=0 for all queries x$_i$ and y$_j$.

Definition 1. An ABE scheme is adaptively many-ciphertext secure if for all efficient $\mathcal{A}$, $$Adv_{ABE,\mathcal{A}}(\lambda) := \left| Pr[\beta = \beta'] - \frac{1}{2} \right|$$

is negligible in $\lambda$.

Boolean formulae and MSP Boolean formulae are a common way to model access control. A (monotone) boolean formula consists of and or gates, where each input is associated with an attribute in the universe of attributes denoted by $\mathcal{U}$. Monotone means that an authorized user who acquires more attributes will not lose any privileges. Let $\mathcal{S} \subseteq \mathcal{U}$ be a set of attributes. We say that $\mathcal{S}$ satisfies a boolean formula if we set all inputs of the formula that map to an attribute in $\mathcal{S}$ to true and the others to false and the formula evaluates to true.

Monotone span programs (MSP) are a more general class of functions and include boolean formulae. We encode an access structure by a policy (M, π), where M $\in \mathbb{Z}_p^{n_1 \times n_2}$ and π: $[n_1] \rightarrow \mathcal{U}$. Note that we can compute (M, π) for any (monotone) boolean formula in polynomial time. Then every row M$_i$ corresponds to an input to the formula and the number of columns is the same as the number of and gates. If the mapping π is not injective, we use the notation ρ(i):= |{z|π(z)=π(i), z≤i}| to denote the ρ(i)-th occurrence of attribute π(i).

Let $\mathcal{S} \subseteq \mathcal{U}$ be a set of attributes and I={i|i∈ [n$_1$], π(i)∈ $\mathcal{S}$ } be the indices of rows in M that are associated with $\mathcal{S}$. We say that (M, π) accepts $\mathcal{S}$ if the vector (1, 0, . . . , 0) lies in the span of rows associated with $\mathcal{S}$. This means, there exist constants $\gamma_i \in \mathbb{Z}_p$ for i∈ I such that $\Sigma_{i \in I} \gamma_i M_i$=(1, 0, . . . , 0). These constants can be computed in time polynomial in the size of M. On the contrary, (M, π) does not accept $\mathcal{S}$ if there exist a vector w∈ $\mathbb{Z}_p^{n_2}$ such that w is orthogonal to all rows M$_i$ for π(i)∈ $\mathcal{S}$, but not to (1, 0, . . . , 0). That means $\langle$ w, M$_i \rangle$ =0. W.l.o.g. we can set w[1]=1.

Polynomials. Let p be a prime and n∈ $\mathbb{N}$. We denote the set of multi-variate polynimals over $\mathbb{Z}_p$ with indeterminates $\tilde{x}_1, \ldots, \tilde{x}_n$ by $\mathbb{Z}_p [\tilde{x}_1, \ldots, \tilde{x}_n]$.

PES-ABE

We consider PES-ABE, which is a standard ABE scheme augmented with 3 deterministic algorithms Setup$_0$, Enc$_0$, KeyGen$_0$ used in Setup, Enc, KeyGen, Dec respectively, where:

Setup$_0(1^\lambda, \mathcal{X}, \mathcal{Y})$ outputs n∈ $\mathbb{N}$,

Enc$_0$(x) outputs linear functions c$^1$: $\mathbb{Z}_p^{wn} \rightarrow \mathbb{Z}_p^{w_1}$, c$^2$: $\mathbb{Z}_p^w \rightarrow \mathbb{Z}_p^{w_2}$, KeyGen$_0$(y) outputs linear functions k$^1$: $\mathbb{Z}_p^{1+m-mn} \rightarrow \mathbb{Z}_p^{m_1}$, k$^2$: $\mathbb{Z}_p^m \rightarrow \mathbb{Z}_p^{m_2}$, and Setup($1^\lambda$): Run $\mathcal{G} := (p, \mathbb{G}_1, \mathbb{G}_2, \mathbb{G}_T, e, g_1, g_2)$←Group-Gen($1^\lambda$), n←Setup$_0$. Pick $$\alpha \xleftarrow{\$} \mathbb{Z}_p$$

and a has function H: [n]→:= Output
mpk$\mathbb{G}_1(\mathcal{G}, H, [\alpha]_T)$,msk:= α

Using H, we implicitly define b∈ $\mathbb{Z}_p^n$ via [b[i]]$_1$=H(i).

Enc: Run (c$^1$, c$^2$)←Enc$_0$(x). Pick s←$\mathbb{Z}_p^w$. Compute [c$^1$]$_1$:= c$^1$([s⊗b]$_1$), [c$^2$]$_2$:= c$^2$([s]$_2$) where c$^2$[1]=s[1]. Output
ct:= ([c$^1$]$_1$,[c$^2$]$_2$),kem:= [αs[1]]$_T$ KeyGen: Run $(k^1, k^2) \leftarrow \text{KeyGen}_0(y)$. Pick $r \leftarrow \mathbb{Z}_p^m$. Compute $[k^1]_1 := k^1([\alpha]_1, [r]_1, [b \otimes r]_1)$, $[k^2]_2 := k^2([r]_2)$. Output $$sk := ([k^1]_1, [k^2]_2)$$

Note that Enc and KeyGen compute the linear functions $c^1$, $k^1$ "in the exponent" since it only knows $[b]_1$ and not b. We also require that $c^1$, $k^1$ depend only on a polynomial number of entries in b, so that Enc, KeyGen only need to make a polynomial number of calls to H to compute $[c^1 (s \otimes b)]_1$ and $[k(\alpha, r, b \otimes r)]_1$ respectively. Depending on the application, some of these calls to H can also be pre-computed.

Remark 1 (Decryption). Note that we can augment PES-ABE with an additional deterministic algorithm $\text{Dec}_0$ used in Dec where $\text{Dec}_0(x, y)$ outputs $e \in \mathbb{Z}_p^{w_1 m_2}$, $e' \in \mathbb{Z}_p^{w_2 m_1}$;

$\text{Dec}(\text{mpk}, x, y, \text{ct}=([c^1]_1, [c^2]_2), \text{sk}=([k^1]_1, [k^2]_2))$: Run $(e, e') \leftarrow \text{Dec}_0(x, y)$. Compute $[k^1 \otimes c^2]_T$, $[c^1 \otimes k^2]_T$ using e, and output $[(k^1 \otimes c^2) \cdot e^T + (c^1 \otimes k^2) \cdot e'^T]_T$.

It would then follow from ABE correctness that if $P(x, y)=1$, $(k^1 \otimes c^2) \cdot e^T + (c^1 \otimes k^2) \cdot e'^T = \alpha s[1]$. We omit $\text{Dec}_0$ in our presentation and instead, specify and analyze Dec for correctness directly. This does not affect our security notions and proofs which only refer to Enc, KeyGen, $\text{Enc}_0$, $\text{KeyGen}_0$.

Toolkit and Library Implementations

FIG. 1 illustrates a comprehensive software library architecture that may be utilized in conjunction with the claimed invention. This architecture encompasses a multifaceted approach to implementing attribute-based encryption (ABE) schemes and associated cryptographic functionalities.

The systems, methods, and executable code described herein may be implemented using a variety of programming languages and paradigms. In some aspects, a C/C++ software library may serve as the foundation, offering high performance and low-level control. However, alternative implementations may utilize languages such as Rust for memory safety, Go for concurrent programming, or Java for platform independence. The library may be designed with a modular structure, allowing for easy integration of multiple attribute-based encryption schemes alongside a wide array of core cryptographic functionalities.

The cryptographic functionalities supported by the library may include, but are not limited to, authenticated symmetric-key encryption algorithms such as AES-GCM, ChaCha20-Poly1305, and potential post-quantum candidates like AEGIS. Public key encryption schemes including RSA, elliptic curve cryptography (ECC) variants, and lattice-based systems like NTRU or Kyber may also be supported. Digital signature algorithms encompassing RSA-PSS, ECDSA, EdDSA, and potential quantum-resistant options such as SPHINCS+ or Dilithium may be included. The library may offer robust support for X.509 certificate handling with various extensions, revocation mechanisms (CRL, OCSP), and certificate transparency logging. Key derivation functions including PBKDF2, scrypt, Argon2, and HKDF may be implemented for different use cases and security requirements. Pseudorandom number generators implementing cryptographically secure algorithms like ChaCha20-based CSPRNG, HMAC-DRBG, and potential quantum-resistant options may also be provided.

The library may be designed as a comprehensive cryptographic toolkit, incorporating state-of-the-art algorithms and industry-standard functions. This may include implementations of the latest NIST-approved cryptographic standards, as well as experimental or emerging cryptographic primitives for research and advanced applications. The library may also provide abstractions for hardware security modules (HSMs) and trusted platform modules (TPMs) to leverage hardware-based security features when available.

In some embodiments, the library may expose its functionality through a well-defined application programming interface (API). This API may be designed with multiple layers of abstraction, including a low-level API providing direct access to cryptographic primitives for maximum flexibility and performance, a mid-level API offering object-oriented abstractions of cryptographic operations for ease of use, and a high-level API presenting task-oriented interfaces for common cryptographic workflows. The API design may incorporate principles of secure API design, such as immutable objects to prevent accidental state modifications, strong typing to catch potential misuse at compile-time, consistent error handling mechanisms with detailed error information, automatic memory zeroization for sensitive data, and side-channel resistant implementations of critical operations.

The overall system may enable developers to seamlessly integrate Attribute-Based Encryption (ABE) technology into a wide range of applications. This integration may extend to various domains including healthcare systems for fine-grained access control of electronic health records, financial services for secure data sharing and regulatory compliance, Internet of Things (IoT) ecosystems for device authentication and data protection, cloud storage systems for encrypted data sharing with complex access policies, and blockchain and distributed ledger technologies for privacy-preserving smart contracts.

The library may provide a generalized API that simplifies the encryption process by identifying and abstracting common elements across different ABE schemes. This abstraction may involve a unified representation of access structures, supporting both Boolean formulas and Linear Secret Sharing Schemes (LSSS), standardized interfaces for attribute authorities, including support for multi-authority ABE schemes, common abstractions for bilinear pairings, allowing easy switching between different pairing-friendly curves, and unified key management interfaces supporting various key formats and storage mechanisms.

Some embodiments may include a single, polymorphic interface capable of handling an arbitrary number of ABE schemes. This design may utilize advanced programming techniques such as template metaprogramming for compile-time scheme selection and optimization, type erasure for runtime scheme selection and dynamic dispatch, and policy-based design for customizing scheme behaviors without runtime overhead. This flexible architecture may enable applications to transition from one ABE scheme to another with minimal code changes. The transition process may involve automatic migration of existing keys and ciphertexts to the new scheme format, compatibility layers for gradual migration in large-scale systems, and performance profiling tools to assist in selecting the most appropriate scheme for specific use cases.

The API may provide different options to accommodate variations in underlying scheme types. For instance, for key-policy ABE schemes, the API may offer interfaces for defining complex access structures using Boolean formulas, threshold gates, or even regular languages. For ciphertext-policy ABE schemes, the API may provide methods for efficiently encoding access policies in ciphertexts, with options for compact representations. For multi-authority ABE schemes, the API may include interfaces for distributed setup protocols and collaborative key generation.

In some embodiments, the API may be connected to and implemented via one or more specific math libraries. These math libraries may include GMP (GNU Multiple Precision Arithmetic Library) for arbitrary-precision arithmetic, FLINT (Fast Library for Number Theory) for advanced number theoretic operations, MIRACL (Multiprecision Integer and Rational Arithmetic Cryptographic Library) for efficient implementations of elliptic curve cryptography, RELIC (Efficient Library for Cryptography) for pairing-based cryptography and efficient field arithmetic, and NTL (Number Theory Library) for advanced algebraic computations.

The library may be designed with modularity as a core principle, allowing users to swap one cryptographic scheme for another without updating application logic. This modularity may extend to interchangeable underlying mathematical libraries for performance optimization on different platforms, pluggable random number generators to accommodate various sources of entropy, customizable key derivation functions to suit different security requirements, and extensible attribute encoding schemes for domain-specific attribute representations.

The library may support any routines necessary to perform common cryptographic tasks, potentially including key generation for various cryptographic primitives, secure key exchange protocols (e.g., Diffie-Hellman, ECDH), digital envelope techniques for hybrid encryption, and threshold cryptography primitives for distributed trust scenarios. The library may be designed to be extensible, supporting additional advanced encryption scheme types as they are developed. This extensibility may be achieved through a plugin architecture allowing the addition of new schemes without modifying the core library, a standardized interface for defining new mathematical structures and operations, and a framework for implementing and testing experimental cryptographic primitives.

Furthermore, the library may incorporate best practices in encryption scheme design, including resistance against chosen ciphertext attacks through techniques such as Fujisaki-Okamoto transformation for ABE schemes, OAEP (Optimal Asymmetric Encryption Padding) for public-key encryption, and authenticated encryption modes for symmetric encryption. An interface for transporting symmetric keys may be provided, which may include key wrapping mechanisms using established standards (e.g., RFC 3394), key agreement protocols for secure key exchange, and key derivation mechanisms for generating session keys. Support for performing encryption of large data objects may be included, potentially incorporating streaming encryption interfaces for handling data larger than available memory, parallelized encryption algorithms for improved performance on multi-core systems, and integration with memory-mapped file I/O for efficient handling of large files.

The library may support an extensive array of attribute-based encryption (ABE) Key Encapsulation Mechanism (KEM) schemes, including Key-Policy ABE schemes such as the original Goyal-Pandey-Sahai-Waters construction, large universe constructions based on composite order groups, and constant-size ciphertext schemes for specific classes of access structures. Ciphertext-Policy ABE schemes may include the Bethencourt-Sahai-Waters scheme and its optimizations, Waters' dual system encryption based schemes, and schemes based on the Learning With Errors (LWE) assumption for post-quantum security. NTT's patented Multi-authority ABE may be supported, potentially including variants such as decentralized multi-authority ABE without a trusted setup, traceable multi-authority ABE for accountability, and policy-hiding multi-authority ABE for enhanced privacy. Chosen-ciphertext security may be provided for each ABE KEM scheme type through techniques such as Canetti-Halevi-Katz (CHK) transformation, Boneh-Katz transformation, and direct constructions of CCA-secure ABE schemes.

Public-key encryption with chosen-ciphertext security may include implementations of RSA-OAEP (Optimal Asymmetric Encryption Padding), ECIES (Elliptic Curve Integrated Encryption Scheme), and post-quantum candidates like Kyber or NTRU with appropriate CCA transformations. Digital signature schemes such as RSA-PSS (Probabilistic Signature Scheme), ECDSA (Elliptic Curve Digital Signature Algorithm), EdDSA (Edwards-curve Digital Signature Algorithm), and lattice-based signatures like FALCON or Dilithium for post-quantum security may be supported. Authenticated symmetric-key encryption algorithms may include AES-GCM (Galois/Counter Mode), ChaCha20-Poly1305, AES-CCM (Counter with CBC-MAC), and potential post-quantum symmetric primitives as they are standardized.

The library may include several common cryptographic tools such as Linear Secret Sharing Schemes (LSSS) with support for Shamir's secret sharing, additive secret sharing, and replicated secret sharing for efficiency in certain applications. Key Derivation Functions (KDF) such as HKDF (HMAC-based Key Derivation Function), PBKDF2 (Password-Based Key Derivation Function 2), and Argon2 for memory-hard key derivation may be implemented. Pseudo-Random Functions (PRF) including HMAC-based PRFs, AES-based PRFs, and potential lattice-based PRFs for post-quantum applications may be supported.

A modular Random Number Generator (RNG) system that can be interchanged with various Pseudo-Random Generators (PRG) may be provided. This system may support hardware-based random number generators when available, OS-provided entropy sources (e.g., /dev/urandom on Unix-like systems), and cryptographically secure PRNGs such as ChaCha20-based CSPRNG, HMAC-DRBG as specified in NIST SP 800-90A, and potential post-quantum secure PRNGs based on lattice problems.

With respect to the Key-Policy ABE (KP-ABE) methods described herein, the library may support a setup algorithm for generating the public parameters and the master secret key for a single authority. This may include selection of appropriate bilinear groups and pairing-friendly curves, generation of random elements for the public parameters, and secure storage of the master secret key, potentially using hardware security modules. An authority-run keygen algorithm to generate a user's private key with an access structure that grants them fine-grained access may be implemented. This may involve efficient encoding of complex access structures, techniques for hiding the access structure in the private key for enhanced privacy, and support for attribute hierarchies and wildcards in access policies. An encryption algorithm taking as input a descriptive set of attributes and outputting a symmetric key and ciphertext may be provided. This may include efficient attribute hashing techniques, optimizations for handling large attribute sets, and support for adding public attributes to the ciphertext for enhanced functionality. A decryption algorithm used by an authorized user to decrypt a ciphertext may be implemented, involving optimized pairing computations for efficient decryption, techniques for outsourcing expensive computations in resource-constrained environments, and support for proxy re-encryption in certain KP-ABE variants.

Regarding the Ciphertext-Policy ABE (CP-ABE) methods described herein, the library may support a setup algorithm that generates the public parameters and the master secret key for a single authority. This may include techniques for distributed setup in multi-authority scenarios, support for adding new attributes to the system after initial setup, and generation of commitment schemes for verifiable parameter generation. An authority-run keygen algorithm to generate a private key for a particular user that grants them a set of attributes may be implemented. This may involve techniques for binding user identities to attribute private keys, support for attribute expiration and revocation mechanisms, and methods for generating keys with numerical attributes and range queries. An encryption algorithm that takes as input an access structure and outputs a symmetric key and ciphertext may be provided. This may include efficient encoding of Boolean formulas and threshold gates in ciphertexts, support for hidden access policies in certain CP-ABE variants, and techniques for generating ciphertexts with multiple recipient groups. A decryption algorithm used by an authorized user to decrypt a ciphertext may be implemented, involving optimizations for handling large attribute sets during decryption, support for gradual release of encrypted data based on partial policy satisfaction, and techniques for verifiable decryption in certain application scenarios.

The library may support advanced cryptographic primitives and protocols, including multiple Key Derivation Functions (KDF) such as HKDF for expanding keys from high-entropy inputs, PBKDF2, bcrypt, and scrypt for password-based key derivation, and Argon2 (winner of the Password Hashing Competition) for memory-hard key derivation. Various Pseudo-random Generators (PRG) may be supported, including ChaCha20-based CSPRNG for high-performance applications, HMAC-DRBG and Hash-DRBG as specified in NIST SP 800-90A, and potential post-quantum secure PRGs based on lattice problems or symmetric primitives. Message Authentication Codes (MACs) such as HMAC for hash-based message authentication, CMAC for block cipher-based message authentication, and Poly1305 for high-performance authentication in certain protocols may be implemented. Pseudo-random Functions (PRF) including HMAC-based PRFs for general-purpose applications, AES-based PRFs for high-performance scenarios, and potential lattice-based PRFs for post-quantum applications may be supported. Random Number Generation (RNG) systems may be provided, supporting hardware-based random number generators (e.g., RDRAND instruction on Intel processors), OS-provided entropy sources with appropriate health checks and entropy estimation, and hybrid systems combining multiple entropy sources for enhanced security. Keystore implementations may be included, supporting secure key storage using OS-provided keychain services, integration with hardware security modules (HSMs) for high-security environments, encrypted file-based keystores with configurable key derivation parameters, and in-memory keystores for temporary key management during runtime.

A comprehensive Math Library (ML) may be provided, offering a generic mathematics API to support various cryptographic operations. This Math Library may include pairing modules supporting Type 1, Type 2, and Type 3 pairings, optimal Ate pairings on Barreto-Naehrig curves, efficient implementations of the Tate pairing, and potential quantum-resistant pairings based on isogenies or other post-quantum constructions. Base math libraries may be included, supporting arbitrary-precision integer arithmetic, finite field arithmetic for various field sizes and representations, polynomial arithmetic over various rings and fields, and matrix operations. The Math Library may also provide implementations of various elliptic curves, including those standardized by NIST, Brainpool curves, and curves suitable for pairing-based cryptography such as BN curves and BLS curves. Advanced number-theoretic algorithms such as primality testing, integer factorization, and discrete logarithm computation may be included to support cryptanalysis and security parameter selection.

Throughout this disclosure, various terms and phrases are used to describe features of the disclosed technology. It is to be understood that these terms and phrases may encompass a variety of meanings and definitions, as is common in the field of technology and patent law. The definitions of these terms may vary depending on the context in which they are used, the specific embodiment being described, or the interpretation of the technology by those skilled in the art.

In various embodiments, certain variable names, symbols, or labels may be used in the claims to represent various elements, components, or steps of the described methods, systems, and apparatuses. These variable names, symbols, or labels are provided for convenience and clarity in describing the claimed subject matter. However, it should be understood that the use of such variable names, symbols, or labels in the claims does not necessarily limit these elements, components, or steps to being the same specific entities described in the specification or in other parts of the disclosure. The variable names, symbols, or labels used in the claims should be interpreted broadly and may encompass various implementations, variations, or equivalents of the described elements, components, or steps, unless explicitly stated otherwise or clearly limited by the context of the claim. As such, the scope of the claims is not confined to the specific examples or embodiments described in the specification, but rather extends to the full breadth of the inventive concepts disclosed herein.

For instance, terms such as "computing device," "processor," "memory," and "network" may refer to a wide range of devices, components, systems, and configurations known in the art, and their specific definitions may differ based on the implementation or design of the system. Similarly, phrases like "securely storing," "computing a vector," and "generating a message" may involve various methods, techniques, and processes that achieve the same or similar outcomes but may be executed in different manners.

It is also to be understood that the use of terms in the singular or plural form is not intended to limit the scope of the claims. For example, the mention of "a computing device" does not preclude the presence of multiple computing devices within a system. Likewise, references to "a network" may include various interconnected networks or a single network comprising multiple segments or layers.

Furthermore, the use of the term "may" in relation to an action or feature indicates that the action or feature is possible, but not necessarily mandatory. This term is used to describe optional or alternative aspects of the disclosed technology that provide flexibility in how the technology may be implemented or utilized.

The definitions provided herein are intended to serve as examples and are not exhaustive. Those skilled in the art may ascribe different meanings to these terms based on the context, the specific technology being described, or the advancements in the field. Therefore, the definitions of the terms and phrases used in this disclosure and the claims are to be interpreted broadly and in a manner consistent with the understanding of those skilled in the relevant art.

The use of the word "a" or "an" when used in conjunction with the claims herein is to be interpreted as including one or more than one of the element it introduces. Similarly, the use of the term "or" is intended to be inclusive, such that the phrase "A or B" is intended to include A, B, or both A and B, unless explicitly stated otherwise.

Reference throughout the specification to "one embodiment," "another embodiment," "an embodiment," and so forth, means that a particular feature, structure, or characteristic described in connection with the embodiment is included in at least one embodiment of the present disclosure, and may not necessarily be present in all embodiments. Furthermore, the particular features, structures, or characteristics may be combined in any suitable manner in one or more embodiments without limitation.

The use of the terms "first," "second," and the like does not imply any order or sequence, but are used to distinguish one element from another, and the terms "top," "bot-tom," "front," "back," "leading," "trailing," and the like are used for descriptive purposes and are not necessarily to be construed as limiting.

As used herein, the term "processor" refers to any computing entity capable of executing instructions to perform a specific set of operations, whether implemented in hardware, firmware, software, or any combination thereof. This definition includes, but is not limited to, the following types of processors: Central Processing Unit (CPU), Graphics Processing Unit (GPU), Digital Signal Processor (DSP), Field-Programmable Gate Array (FPGA), Application-Specific Integrated Circuit (ASIC), microcontroller, System on Chip (SoC), Neural Processing Unit (NPU), quantum processor, cloud-based and distributed processors, multi-core and parallel processors, and virtual processors. The term "processor" also encompasses the associated memory hierarchies, including primary memory (such as RAM), secondary storage (such as hard drives and SSDs), and cache memory, which work in conjunction with the processor to store and retrieve data necessary for executing instructions. In this patent application, any reference to a "processor" should be interpreted broadly to include any type of processing unit capable of performing the described functions, regardless of its specific implementation, architecture, or physical form.

As used herein, the term "messages" may refer to any form of data or information that can be processed, transmitted, or stored in a digital format. Messages may include, but are not limited to, arbitrary-length plaintext messages, pre-hashed messages, concatenated messages, binary data, network protocol messages, database records, and time-stamped messages. Messages may be composed of characters, symbols, or binary data and may represent various forms of content such as text, numbers, multimedia, executable code, or any other data that can be digitally encoded. Messages may be used as input for cryptographic functions, such as keyed hash functions, where they are transformed into a fixed-size hash value influenced by a secret cryptographic key. The term "messages" encompasses a wide range of data types and structures, from simple text strings to complex structured data, and may include metadata, headers, footers, or other information that facilitates the processing, transmission, or interpretation of the content. Messages may be generated by users, systems, or processes and may be intended for various purposes, including communication, authentication, verification, logging, or any other function that involves the use of digital data.

The term "database" should be construed to mean a blockchain, distributed ledger technology, key-value store, document-oriented database, graph database, time-series database, in-memory database, columnar database, object-oriented database, hierarchical database, network database, or any other structured data storage system capable of storing and retrieving information. This may include traditional relational database management systems (RDBMS), NoSQL databases, NewSQL databases, or hybrid database systems that combine multiple database paradigms. The database may be centralized, distributed, or decentralized, and may employ various data models, indexing strategies, and query languages to organize and access the stored information. It may also incorporate features such as ACID (Atomicity, Consistency, Isolation, Durability) compliance, eventual consistency, sharding, replication, or partitioning to ensure data integrity, avail-ability, and scalability. The database may be hosted on-premises, in the cloud, or in a hybrid environment, and may support various access methods including direct queries, API calls, or event-driven architectures.

The terms "connected," "coupled," or any variant thereof, mean any direct or indirect connection or coupling between two or more elements, and may encompass the presence of one or more intermediate elements between the two elements that are connected or coupled to each other.

The description of the embodiments of the present disclosure is intended to be illustrative, and not to limit the scope of the claims. Many alternatives, modifications, and variations will be apparent to those skilled in the art. A number of implementations have been described. Nevertheless, it will be understood that various modifications may be made without departing from the spirit and scope of the disclosure. Accordingly, other implementations are within the scope of the following claims.

The invention claimed is:

1. A method for implementing key-policy attribute-based encryption, the method comprising:

(a) receiving, by one or more hardware processors, a plaintext message to be encrypted, a master public key, and a set of attributes;

(b) generating, by the one or more hardware processors, a random integer s within a range defined by a prime integer p, wherein the prime integer p is established by a pairing-friendly elliptic curve comprising a first source group $\mathbb{G}_{11}$, a second source group $\mathbb{G}_{22}$, and a target group $\mathbb{G}_{TT}$;

(c) computing, by the one or more hardware processors, a set of attribute encodings by:

(i) hashing each attribute in the set of attributes to an element of the first source group $\mathbb{G}_{11}$, and (ii) multiplying each hashed attribute by the random integer s;

(d) deriving, by the one or more hardware processors, a blinding factor by multiplying a target group element from the master public key by the random integer s;

(e) generating, by the one or more hardware processors, a masked message by combining the plaintext message with the blinding factor;

(f) constructing, by the one or more hardware processors, a ciphertext comprising:

(i) the masked message, (ii) the set of attributes, (iii) the set of attribute encodings, and (iv) an encoding of the random integer s in the second source group $\mathbb{G}_{22}$; and (g) outputting, by the one or more hardware processors, the ciphertext for storage in a non-transitory computer-readable medium or for transmission over a communications interface to a receiving device;

wherein the pairing-friendly elliptic curve is asymmetric, such that no efficiently computable homomorphism exists from the second source group $\mathbb{G}_{2\,2}$ to the first source group $\mathbb{G}_{1\,1}$; and wherein the outputted ciphertext is decryptable by the receiving device, the receiving device having a secret key associated with a key-policy, only when the set of attributes satisfies the key-policy associated with the secret key.

2. The method of claim 1, further comprising executing a key generation routine, the key generation routine comprising:

(a) receiving a master secret key and the master public key from a setup routine, and a key-policy;

(b) computing shares of the master secret key with respect to the key-policy using a linear secret-sharing scheme, wherein each share is associated with an attribute in the key-policy;

(c) sampling $n_{multiuse}$ random integers between 1 and the prime integer p, where $n_{multiuse}$ is a maximum number of times any attribute appears in the key-policy;

(d) masking each share in the first source group using a secure hash of the attribute and the random integers between 1 and the prime integer p, such that no random integer is used twice for the same attribute by maintaining a counter for each attribute;

(e) computing a secret key as a concatenation of the masked shares and an encoding of the random integers between 1 and the prime integer p in the second source group and the key-policy; and (f) outputting the secret key.

3. The method of claim 2, wherein to select a random oracle hash function (ROH), the processor picks a random 256-bit key, which is input as a prefix to a SHA-256 hash function.

4. The method of claim 1, wherein group operations in the second source group $\mathbb{G}_{2\,2}$ require at least twice as much computational time as group operations in the first source group $\mathbb{G}_{1\,1}$.

5. The method of claim 1, further comprising executing a setup routine, the setup routine comprising:

(a) selecting a random number generator from a library of random number generators, if none have been selected by a user;

(b) picking a master secret key msk as a random integer between 1 and the prime integer p;

(c) picking a secure random oracle hash function (ROH);

(d) computing the master public key based on the pairing-friendly curve, the hash function, and an encoding of msk as a target group element; and (e) establishing a keystore in a device memory, the keystore comprising storage for the master secret key and the master public key.

6. The method of claim 1, further comprising:

(a) receiving a ciphertext, wherein the ciphertext comprises a masked message, a set of attributes, a set of attribute encodings, and an encoding of s in the second source group;

(b) receiving a secret key, wherein the secret key comprises masked shares and an encoding of random integers between 1 and the prime integer p in the second source group and a key-policy;

(c) computing a pairing of the set of attribute encodings in the ciphertext with the encoding of random integers in the secret key;

(d) computing a pairing of masked shares in the secret key with the encoding of s in the ciphertext;

(e) combining an output of the pairing computations to compute a blinding factor using a linear secret-sharing scheme;

(f) combining the blinding factor with the ciphertext to recover the message; and (g) outputting the recovered message.

7. A system for implementing key-policy attribute-based encryption, the system comprising:

(a) one or more hardware processors; and (b) a memory storing instructions that, when executed by the one or more hardware processors, cause the system to perform operations comprising:

(i) receiving a plaintext message to be encrypted, a master public key, and a set of attributes;

(ii) generating a random integer s within a range defined by a prime integer p, wherein the prime integer p is established by a pairing-friendly elliptic curve comprising a first source group $\mathbb{G}_{1\,1}$, a second source group $\mathbb{G}_{2\,2}$, and a target group $\mathbb{G}_{T\,T}$;

(iii) computing a set of attribute encodings by:

(a) hashing each attribute in the set of attributes to an element of the first source group $\mathbb{G}_{1\,1}$, and (b) multiplying each hashed attribute by the random integer s;

(iv) deriving a blinding factor by multiplying a target group element from the master public key by the random integer s;

(v) generating a masked message by combining the plaintext message with the blinding factor;

(vi) constructing a ciphertext comprising:

(a) the masked message, (b) the set of attributes, (c) the set of attribute encodings, and (d) an encoding of the random integer s in the second source group $\mathbb{G}_{2\,2}$; and (vii) outputting the ciphertext for storage in a non-transitory computer-readable medium or for transmission over a communications interface to a receiving device;

wherein the pairing-friendly elliptic curve is asymmetric, such that no efficiently computable homomorphism exists from the second source group $\mathbb{G}_{2\,2}$ to the first source group $\mathbb{G}_{1\,1}$; and wherein the outputted ciphertext is decryptable by the receiving device, the receiving device having a secret key associated with a key-policy, only when the set of attributes satisfies the key-policy associated with the secret key.

8. The system of claim 7, wherein the operations further comprise executing a key generation routine, the key generation routine comprising:

(a) receiving a master secret key and the master public key from a setup routine, and a key-policy;

(b) computing shares of the master secret key with respect to the key-policy using a linear secret-sharing scheme, wherein each share is associated with an attribute in the key-policy;

(c) sampling $n_{multiuse}$ random integers between 1 and the prime integer p, where $n_{multiuse}$ is a maximum number of times any attribute appears in the key-policy;

(d) masking each share in the first source group using a secure hash of the attribute and the random integers between 1 and the prime integer p, such that no random integer is used twice for the same attribute by maintaining a counter for each attribute;
(e) computing a secret key as a concatenation of the masked shares and an encoding of the random integers between 1 and the prime integer p in the second source group and the key-policy; and
(f) outputting the secret key.

9. The system of claim 8, wherein to select a random oracle hash function (ROH), the processor picks a random 256-bit key, which is input as a prefix to a SHA-256 hash function.

10. The system of claim 7, wherein group operations in the second source group $\mathbb{G}_{2\,2}$ require at least twice as much computational time as group operations in the first source group $\mathbb{G}_{1\,1}$.

11. The system of claim 7, wherein the operations further comprise executing a setup routine, the setup routine comprising:
(a) selecting a random number generator from a library of random number generators, if none have been selected by a user;
(b) picking a master secret key msk as a random integer between 1 and the prime integer p;
(c) picking a secure random oracle hash function (ROH);
(d) computing the master public key based on the pairing-friendly curve, the hash function, and an encoding of msk as a target group element; and
(e) establishing a keystore in a device memory, the keystore comprising storage for the master secret key and the master public key.

12. The system of claim 7, wherein the operations further comprise:
(a) receiving a ciphertext, wherein the ciphertext comprises a masked message, a set of attributes, a set of attribute encodings, and an encoding of s in the second source group;
(b) receiving a secret key, wherein the secret key comprises masked shares and an encoding of random integers between 1 and the prime integer p in the second source group and a key-policy;
(c) computing a pairing of the set of attribute encodings in the ciphertext with the encoding of random integers in the secret key;
(d) computing a pairing of masked shares in the secret key with the encoding of s in the ciphertext;
(e) combining an output of the pairing computations to compute a blinding factor using a linear secret-sharing scheme;
(f) combining the blinding factor with the ciphertext to recover the message; and
(g) outputting the recovered message.

13. A non-transitory computer-readable storage medium storing instructions that, when executed by one or more hardware processors, cause the one or more hardware processors to perform operations for implementing key-policy attribute-based encryption, the operations comprising:
(a) receiving a plaintext message to be encrypted, a master public key, and a set of attributes;
(b) generating a random integer s within a range defined by a prime integer p, wherein the prime integer p is established by a pairing-friendly elliptic curve comprising a first source group $\mathbb{G}_{1\,1}$, a second source group $\mathbb{G}_{2\,2}$, and a target group $\mathbb{G}_{T\,T}$;

(c) computing a set of attribute encodings by:
(i) hashing each attribute in the set of attributes to an element of the first source group $\mathbb{G}_{1\,1}$, and
(ii) multiplying each hashed attribute by the random integer s;
(d) deriving a blinding factor by multiplying a target group element from the master public key by the random integer s;
(e) generating a masked message by combining the plaintext message with the blinding factor;
(f) constructing a ciphertext comprising:
(i) the masked message,
(ii) the set of attributes,
(iii) the set of attribute encodings, and
(iv) an encoding of the random integer s in the second source group $\mathbb{G}_{2\,2}$; and
(g) outputting the ciphertext for storage in the non-transitory computer-readable storage medium or for transmission over a communications interface to a receiving device;
wherein the pairing-friendly elliptic curve is asymmetric, such that no efficiently computable homomorphism exists from the second source group $\mathbb{G}_{2\,2}$ to the first source group $\mathbb{G}_{1\,1}$; and
wherein the outputted ciphertext is decryptable by the receiving device, the receiving device having a secret key associated with a key-policy, only when the set of attributes satisfies the key-policy associated with the secret key.

14. The non-transitory computer-readable storage medium of claim 13, wherein the operations further comprise executing a key generation routine, the key generation routine comprising:
(a) receiving a master secret key and the master public key from a setup routine, and a key-policy;
(b) computing shares of the master secret key with respect to the key-policy using a linear secret-sharing scheme, wherein each share is associated with an attribute in the key-policy;
(c) sampling $n_{multiuse}$ random integers between 1 and the prime integer p, where $n_{multiuse}$ is a maximum number of times any attribute appears in the key-policy;
(d) masking each share in the first source group using a secure hash of the attribute and the random integers between 1 and the prime integer p, such that no random integer is used twice for the same attribute by maintaining a counter for each attribute;
(e) computing a secret key as a concatenation of the masked shares and an encoding of the random integers between 1 and the prime integer p in the second source group and the key-policy; and
(f) outputting the secret key.

15. The non-transitory computer-readable storage medium of claim 14, wherein to select a random oracle hash function (ROH), the processor picks a random 256-bit key, which is input as a prefix to a SHA-256 hash function.

16. The non-transitory computer-readable storage medium of claim 13, wherein group operations in the second source group $\mathbb{G}_{2\,2}$ require at least twice as much computational time as group operations in the first source group $\mathbb{G}_{1\,1}$.

17. The non-transitory computer-readable storage medium of claim 13, wherein the operations further comprise executing a setup routine, the setup routine comprising:

(a) selecting a random number generator from a library of random number generators, if none have been selected by a user;

(b) picking a master secret key msk as a random integer between 1 and the prime integer p;

(c) picking a secure random oracle hash function (ROH);

(d) computing the master public key based on the pairing-friendly curve, the hash function, and an encoding of msk as a target group element; and (e) establishing a keystore in a device memory, the keystore comprising storage for the master secret key and the master public key.

18. The non-transitory computer-readable storage medium of claim 13, wherein the operations further comprise:

(a) receiving a ciphertext, wherein the ciphertext comprises a masked message, a set of attributes, a set of attribute encodings, and an encoding of s in the second source group;

(b) receiving a secret key, wherein the secret key comprises masked shares and an encoding of random integers between 1 and the prime integer p in the second source group and a key-policy;

(c) computing a pairing of the set of attribute encodings in the ciphertext with the encoding of random integers in the secret key;

(d) computing a pairing of masked shares in the secret key with the encoding of s in the ciphertext;

(e) combining an output of the pairing computations to compute a blinding factor using a linear secret-sharing scheme;

(f) combining the blinding factor with the ciphertext to recover the message; and (g) outputting the recovered message.

19. The method of claim 1, wherein the pairing-friendly curve is selected from a group consisting of Barreto-Naehrig curves, Barreto-Lynn-Scott curves, and Kachisa-Schaefer-Scott curves.

20. The method of claim 1, wherein the linear secret-sharing scheme is based on Shamir's secret sharing or a monotone span program.

\* \* \* \* \*